(12) United States Patent
Misovski et al.

(10) Patent No.: US 9,275,365 B2
(45) Date of Patent: Mar. 1, 2016

(54) INTEGRATED PRODUCTIVITY SERVICES

(75) Inventors: Filip Misovski, Viernheim (DE); Markus Cherdron, Muehlhausen (DE)

(73) Assignee: SAP SE, Walldorf (DE)

(*) Notice: Subject to any disclaimer, the term of this patent is extended or adjusted under 35 U.S.C. 154(b) by 685 days.

(21) Appl. No.: 13/326,149

(22) Filed: Dec. 14, 2011

(65) Prior Publication Data
US 2013/0159897 A1    Jun. 20, 2013

(51) Int. Cl.
G06F 3/048 (2013.01)
G06Q 10/10 (2012.01)

(52) U.S. Cl.
CPC ..................................... *G06Q 10/10* (2013.01)

(58) Field of Classification Search
None
See application file for complete search history.

(56) References Cited

U.S. PATENT DOCUMENTS

| | | | |
|---|---|---|---|
| 6,282,709 B1 | 8/2001 | Reha et al. | |
| 6,922,723 B1 | 7/2005 | Sharp et al. | |
| 6,952,620 B2 | 10/2005 | Cherdron et al. | |
| 7,212,212 B2 | 5/2007 | Cherdron | |
| 7,225,424 B2 | 5/2007 | Cherdron et al. | |
| 7,409,692 B2 | 8/2008 | Ittel et al. | |
| 7,421,702 B1 | 9/2008 | Margulis et al. | |
| 7,543,268 B2 | 6/2009 | Cherdron et al. | |
| 7,581,204 B2 | 8/2009 | Reeder et al. | |
| 7,600,215 B2 | 10/2009 | Cherdron et al. | |
| 7,664,860 B2 | 2/2010 | Beck et al. | |
| 7,694,140 B1 | 4/2010 | Sachenko et al. | |
| 7,734,560 B2 | 6/2010 | Seeger et al. | |
| 7,765,255 B2 | 7/2010 | Cherdron et al. | |
| 7,769,821 B2 | 8/2010 | Brunswig et al. | |
| 7,797,370 B2 | 9/2010 | Brunswig et al. | |
| 7,870,512 B2 | 1/2011 | Misovski | |
| 7,873,942 B2 | 1/2011 | Shaburov et al. | |
| 8,060,556 B2 | 11/2011 | Krane et al. | |
| 8,117,555 B2 | 2/2012 | Samson et al. | |
| 8,166,448 B2 | 4/2012 | Mitra et al. | |
| 8,219,649 B2 | 7/2012 | Ball | |
| 8,327,273 B2 | 12/2012 | Christianson et al. | |
| 8,346,895 B2 | 1/2013 | Cherdron et al. | |
| 8,418,140 B2 | 4/2013 | Iyer et al. | |
| 8,578,333 B2 | 11/2013 | Sivadas et al. | |
| 8,612,870 B2 | 12/2013 | Kodosky et al. | |
| 2003/0151621 A1* | 8/2003 | McEvilly et al. | 345/744 |
| 2003/0158753 A1* | 8/2003 | Bernston et al. | 705/2 |
| 2004/0153338 A1* | 8/2004 | Kim et al. | 705/2 |
| 2004/0250125 A1 | 12/2004 | Janson et al. | |
| 2005/0026129 A1 | 2/2005 | Rogers | |
| 2005/0071749 A1 | 3/2005 | Goerke | |
| 2005/0071805 A1 | 3/2005 | Lauterbach | |

(Continued)

*Primary Examiner* — Stephen Alvesteffer
(74) *Attorney, Agent, or Firm* — Fish & Richardson P.C.

(57) ABSTRACT

The present disclosure involves systems, software, and computer implemented methods for providing integrated productivity services. One process includes operations for determining a context associated with a user of an application, identifying a user productivity feature for integration with an existing feature of the application based on the context, and augmenting a user interface of the application with a graphical object representing the user productivity feature. In some instances, the context can include an integration context defining a particular release version associated with the application. The context can also or alternatively include a role context defining a particular role of the user of the application within an organization, wherein the particular role is associated with a set of permissions or common tasks performed by the particular role. Still further, the context can include a user context defining a personal preference or habit of the user.

20 Claims, 14 Drawing Sheets

(56) References Cited

U.S. PATENT DOCUMENTS

| | | |
|---|---|---|
| 2005/0160104 A1 | 7/2005 | Meera et al. |
| 2005/0187881 A1* | 8/2005 | McGiffin et al. ............... 705/64 |
| 2006/0168512 A1 | 7/2006 | Wilson et al. |
| 2007/0100943 A1 | 5/2007 | Brunswig et al. |
| 2007/0135121 A1 | 6/2007 | Bae et al. |
| 2007/0149036 A1 | 6/2007 | Misovski |
| 2007/0150562 A1 | 6/2007 | Stull et al. |
| 2007/0162456 A1* | 7/2007 | Agassi et al. ................... 707/10 |
| 2007/0162501 A1 | 7/2007 | Agassi et al. |
| 2007/0220035 A1 | 9/2007 | Misovski |
| 2007/0260737 A1 | 11/2007 | Gomes et al. |
| 2007/0265779 A1 | 11/2007 | Misovski |
| 2008/0010585 A1 | 1/2008 | Schneider et al. |
| 2008/0077384 A1 | 3/2008 | Agapi et al. |
| 2008/0083025 A1 | 4/2008 | Meijer et al. |
| 2008/0098085 A1 | 4/2008 | Krane et al. |
| 2008/0141153 A1 | 6/2008 | Samson et al. |
| 2008/0155425 A1* | 6/2008 | Murthy et al. ................. 715/738 |
| 2008/0244418 A1* | 10/2008 | Manolescu ............ G06Q 10/00 715/753 |
| 2008/0306972 A1 | 12/2008 | Wilkin et al. |
| 2009/0089682 A1* | 4/2009 | Baier et al. .................... 715/751 |
| 2009/0265707 A1 | 10/2009 | Goodman et al. |
| 2009/0300057 A1 | 12/2009 | Friedman |
| 2009/0300604 A1 | 12/2009 | Barringer |
| 2009/0300641 A1 | 12/2009 | Friedman et al. |
| 2010/0064357 A1* | 3/2010 | Baird et al. ...................... 726/6 |
| 2010/0070971 A1 | 3/2010 | Shlomai et al. |
| 2010/0088414 A1 | 4/2010 | Lin et al. |
| 2010/0234009 A1 | 9/2010 | Antani et al. |
| 2010/0241579 A1 | 9/2010 | Bassett et al. |
| 2011/0078600 A1 | 3/2011 | Guertler et al. |
| 2011/0125829 A1 | 5/2011 | Finley et al. |
| 2011/0138340 A1* | 6/2011 | Holm-Petersen et al. .... 715/854 |
| 2011/0154231 A1 | 6/2011 | Cherdron |
| 2011/0191697 A1* | 8/2011 | Sumner ................. G06F 3/048 715/758 |
| 2012/0108172 A1* | 5/2012 | Bullen ........................ 455/41.2 |
| 2012/0284312 A1 | 11/2012 | Gore et al. |
| 2012/0290678 A1 | 11/2012 | Dawson et al. |
| 2012/0297066 A1 | 11/2012 | Hewett |
| 2012/0324069 A1 | 12/2012 | Nori et al. |
| 2013/0039360 A1 | 2/2013 | Manian et al. |
| 2013/0085810 A1 | 4/2013 | Driesen et al. |
| 2013/0145240 A1 | 6/2013 | Anderson et al. |

* cited by examiner

FIG. 3B

Display Document: Line Item 001 — 302

| Customer | 199 | ABCD AG | G/L Acc | 150200 |
| CoCode | 0001 | Carl-Bosch-Strasse | | |
| XYZ A.G. | | Ludwigshafen | Doc. No. | 100001733 |

Line Item 1 / Reverse invoice / 12

Amount: 625,47  EUR

Additional Data

| Bus. Area | | | | |
| Disc. base | 0,00 | | Disc. Amount | 0,00 | EUR |
| Payt terms | | | Days/percent | 0 | 0,000 | % | 0 | 0,000 | % | 0 | 0,000 |
| Bline date | 01.02.2012 | | | | |
| Print block | N | | Flow Type | 3180 | |
| Contract | 92002854 | / | 1 | | |
| Clearing | 01.02.2012 | / | 100001733 | | |
| Assignment | 0000092002854 | | | | |
| Text | *A_CL Int. on Arrears Due 0000092002854!!!! | | | | |

Long text

Related Services — 306

Add  Einfügen  Verbinden

▽ Document Flow
Document Flow — 306a

▽ Email Services
Send Object
Email Outbox

▽ Accounts Receivable Reporting
Customer Balances: Totals (List)
Customer Balances: Period Drill Down (List)
Customer Balances (Analysis)
Customer Line Items (List)  306b
Customer Line Items (Analysis)
Customer Due Date Analysis: Document Dril...
Customer Due Date Analysis: Totals (List)
Customer Due Date Analysis (Analysis)
Customer Due Date Forecast (List)
Customer Due Date Forecast (Analysis)
Customer Overdue Analysis (List)
Customer Overdue Analysis (Analysis)
Customer Payment History (List)
Customer Payment History (Analysis)
Customer DSO Analysis (Analysis)

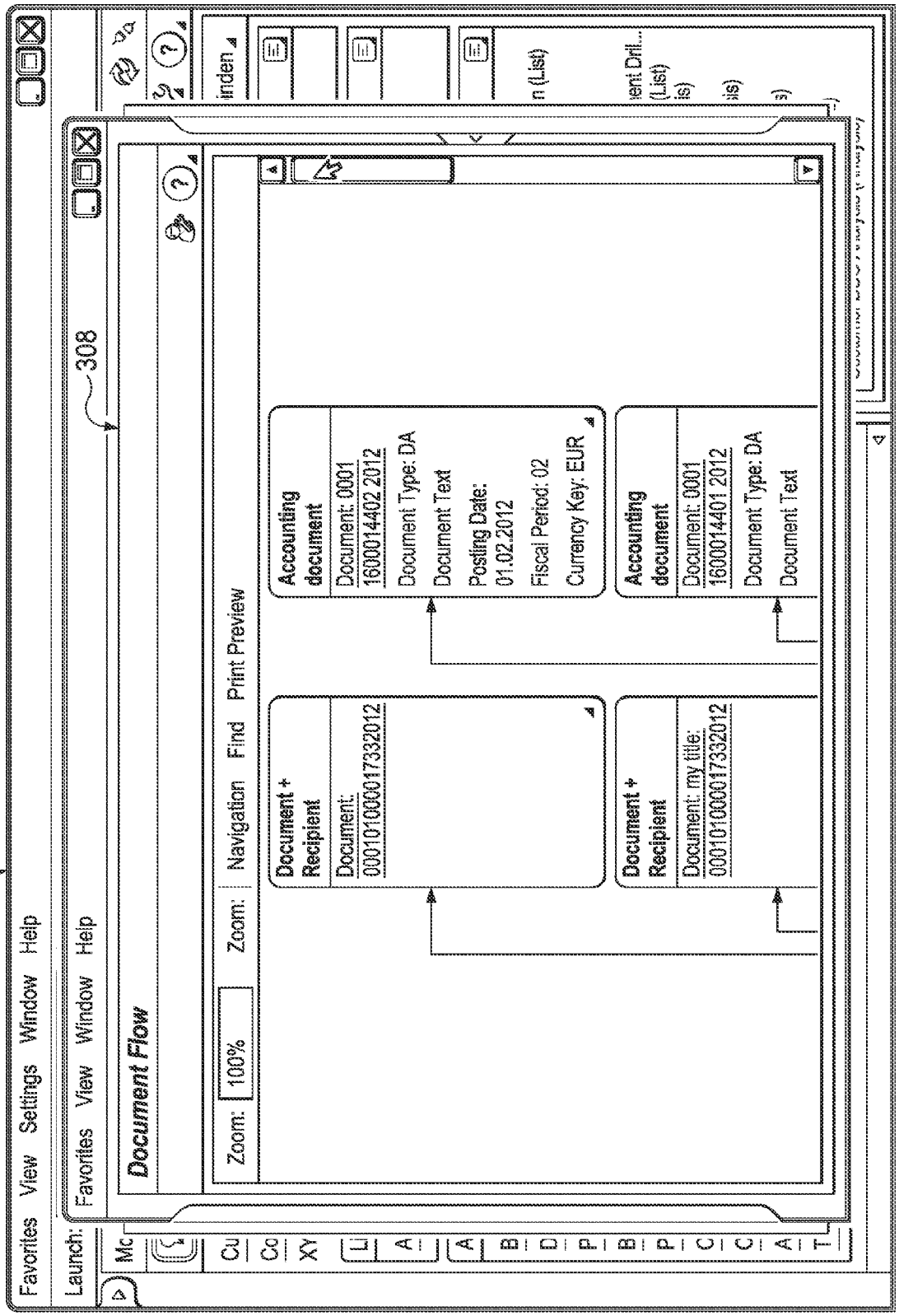

Business Worklist Configurator — 402

Select Queries — 404

Your current default backend destination is UC2 (User Productivity On Demand Services 1.0 – Testsystem 701).
Explicitly choose a destination only if you wish to override this default and be careful when publishing.

| Destination 406 | Worklist Type 408 | POWL Application 410 | Queries 412 |
|---|---|---|---|
| --- Default Backe | IQ InfoSet | /KYK/ISQ_RFDSL | /UPOS/SFLIGHT All A |
| UC2 User Producti | POWL Person | /KYK/ISQ_RFKOPR00 | /UPOS/SFLIGHT_LH All L |
| EH3 XYZ Business | POWLAPPS Unsupp | /KYK/ISQ_RFKSL | /UPOS/SFLIGHT_ALL All F |
| EH3 XYZ Business | | /KYK/ISQ_RFKUM | |
| UC1 User Producti | | /KYK/ISQ_RMPLA | |
| UD1 User Producti | | /KYK/ISQ_RPLIC | |
| UP1 User Producti | | /KYK/ISQ_STAX | |
| FOO Dummy destin | | /KYK/ISQ_VL10B | |
| FOO Dummy destin | | /UPOS/ISQ_SFLIGHT | |
| FOO Dummy destin | | /UPOS/SFLIGHT | |

[Select Queries]

Define Order and Assign Templates — 414

| Query | Description | Template |
|---|---|---|
| /UPOS/SFLIGHT_ALL | All Flights | A ▼ |

Template Details

A

Cells
↑ ↓ 🗎 🗎 🗑
Airline
Connection Number
Flight Date

Properties of Cell 'Airline'
Field: CARRID ▼
Label: Airline
☑ Include label
Width:
Transaction:

General Settings

Visible Items: 5                    [Save]  [Cancel]

Live Preview

FIG. 4B

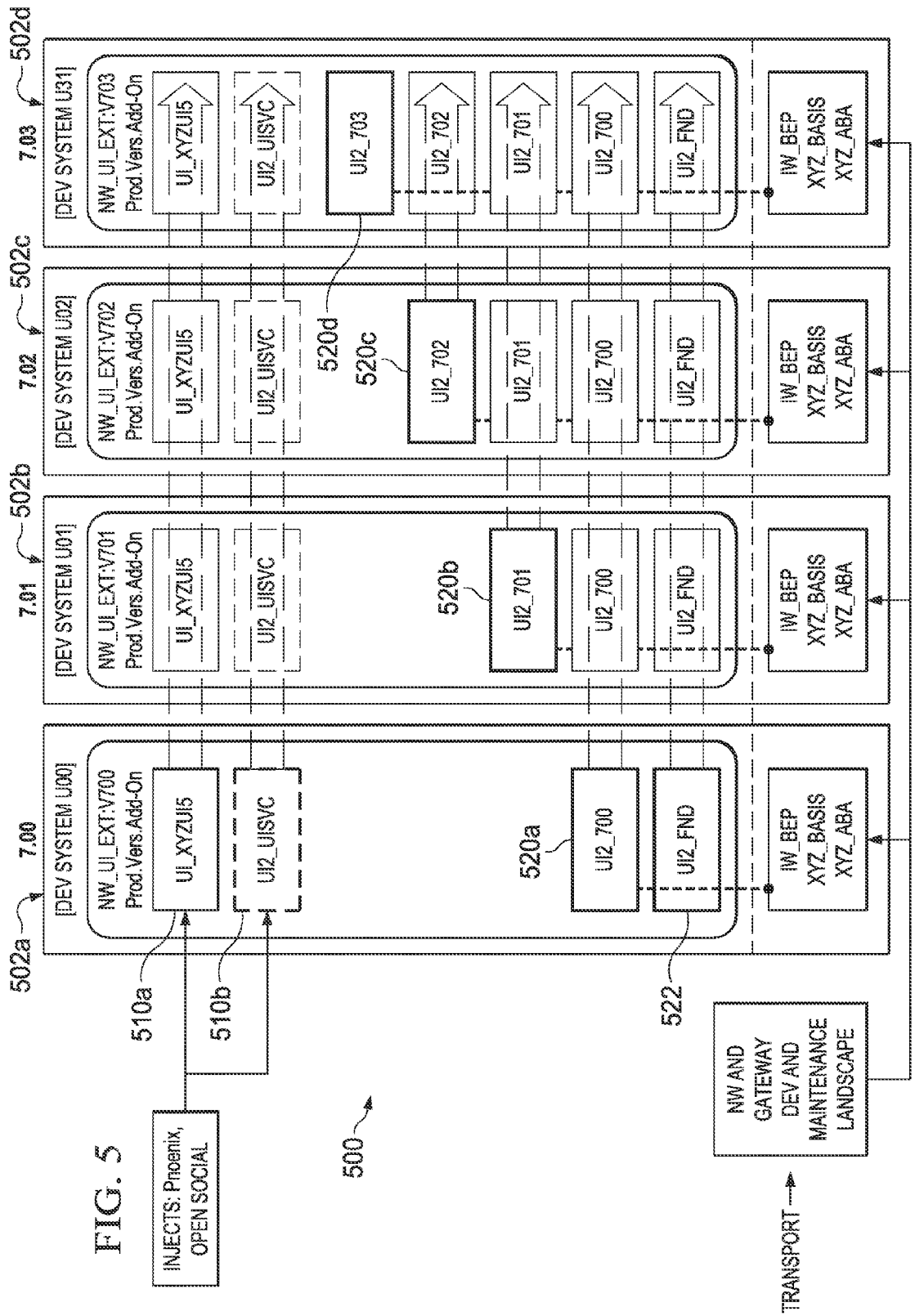

INTEGRATED PRODUCTIVITY SERVICES

RELATED APPLICATIONS

This application is related to U.S. application Ser. No. 13/326,096, titled "SINGLE APPROACH TO ON-PREMISE AND ON-DEMAND COMSUMPTION OF SERVICES," filed Dec. 14, 2011; and is also related to U.S. application Ser. No. 13/326,174, titled "USER-DRIVEN CONFIGURATION," filed Dec. 14, 2011; and is also related to U.S. application Ser. No. 13/326,155, titled "RELEASE INDEPENDENT DEPLOYMENT OF USER PRODUCTIVITY SERVICES," filed Dec. 14, 2011; and fully incorporating the contents therein.

TECHNICAL FIELD

The present disclosure relates to software, computer systems, and computer implemented methods for providing integrated productivity services.

BACKGROUND

Certain user productivity features, applications, add-ons, and/or upgrades may not be available to business applications because they may have outdated or legacy features and/or older user interface (UI) components. A complete upgrade of the business application must be performed to update the business application with a new graphical user interface (GUI) or new features. In some instances, however, the upgraded features are only a small portion of the full set of features available through the application. The upgraded features may also only be used by a small number of users relative to the total number of users of the business application within a business organization. A particular user may also prefer a certain layout or functionality associated with an existing business application but still be interested in certain newer features. Different users with different roles, preferences, or interests may be interested in different features when using the business application. Further, in some cases, the newer features or UI components may be provided by third party services and may not be immediately compatible with an existing business application.

In some computing models, resources such as software and storage space are accessed by clients locally at, for example, a client's desktop computer. The software may be stored and executed from the client's local memory, and further upgrades or features of the software are provided by installing new versions of the software directly on the client computer. Likewise, the client computer may utilize only a local hard disk drive for storage space. The increased use of high bandwidth networks and data connections, as well as high capacity data storage servers, has resulted in the implementation of new and alternative computing models, such as cloud computing solutions. In cloud computing solutions, resources, services, enhanced functionality, or software may be provided to a client computer across a network. Cloud computing models may also be used to provide shared access and remote storage of data to users. In cloud computing solutions, computing resources are provided as hosted services across a network, such as the Internet.

End users of software applications may frequently work in a corporate environment with an information technology (IT) department. Improvements in the end users' productivity may require involvement of existing IT maintenance and administration processes. For example, upgrades to the software applications may be provided using on-premise deployment models involving installation of a complete software package provided by an existing IT department. The end user may be limited to software versions that have been installed by the IT department if the end user's employer has not upgraded to more up-to-date versions of the application. In particular, end users that work in heterogeneous environments may interact with other end users that use different versions of various applications. Certain end users may use web application user interface technology when interacting with other systems or older versions of a front-end enterprise portal. The ever growing and changing demands of businesses may dictate a need or desire for quick updates and release of new features or applications from software developers. In some instances, an older version of an application is used because the end users' employer may not have adopted the newest version. Accordingly, some end users of a particular application may be forced to interface with other end users of the particular application using different versions of the same application. Further, the end user's productivity may be limited by the lack of enhanced functionality and configuration options of the application. Users outside of the end user's IT environment may work with applications (similar to the end user's application) that have a particular configuration of the application based on the users' roles within the working environment. These configurations and preferences implemented by other users may be inaccessible to the user or may require a complete software upgrade due to the restrictions inherent in an existing corporate IT infrastructure.

SUMMARY

The present disclosure involves systems, software, and computer implemented methods for providing integrated productivity services. One process includes operations for determining a context associated with a user of an application, identifying a user productivity feature for integration with an existing feature of the application based on the context, and augmenting a user interface of the application with a graphical object representing the user productivity feature. In some instances, the context can include an integration context defining a particular release version associated with the application. The context can also or alternatively include a role context defining a particular role of the user of the application within an organization, wherein the particular role is associated with a set of permissions or common tasks performed by the particular role. Still further, the context can include a user context defining a personal preference or habit of the user.

While generally described as computer implemented software embodied on non-transitory media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIGS. 3A-3G illustrate example screenshots of providing user productivity and integrated services using an appropriate system, such as the system described in FIG. 1;

FIGS. 4A-4B illustrate example screenshots of providing a configurator tool for allowing decoupled user-driven configuration of user productivity and integration services using an appropriate system, such as the system described in FIG. 1;

FIG. 5 illustrates an example diagram depicting release independent development and shipment of user productivity and integration services using an appropriate system, such as the system described in FIG. 1;

DETAILED DESCRIPTION

Figure 1:
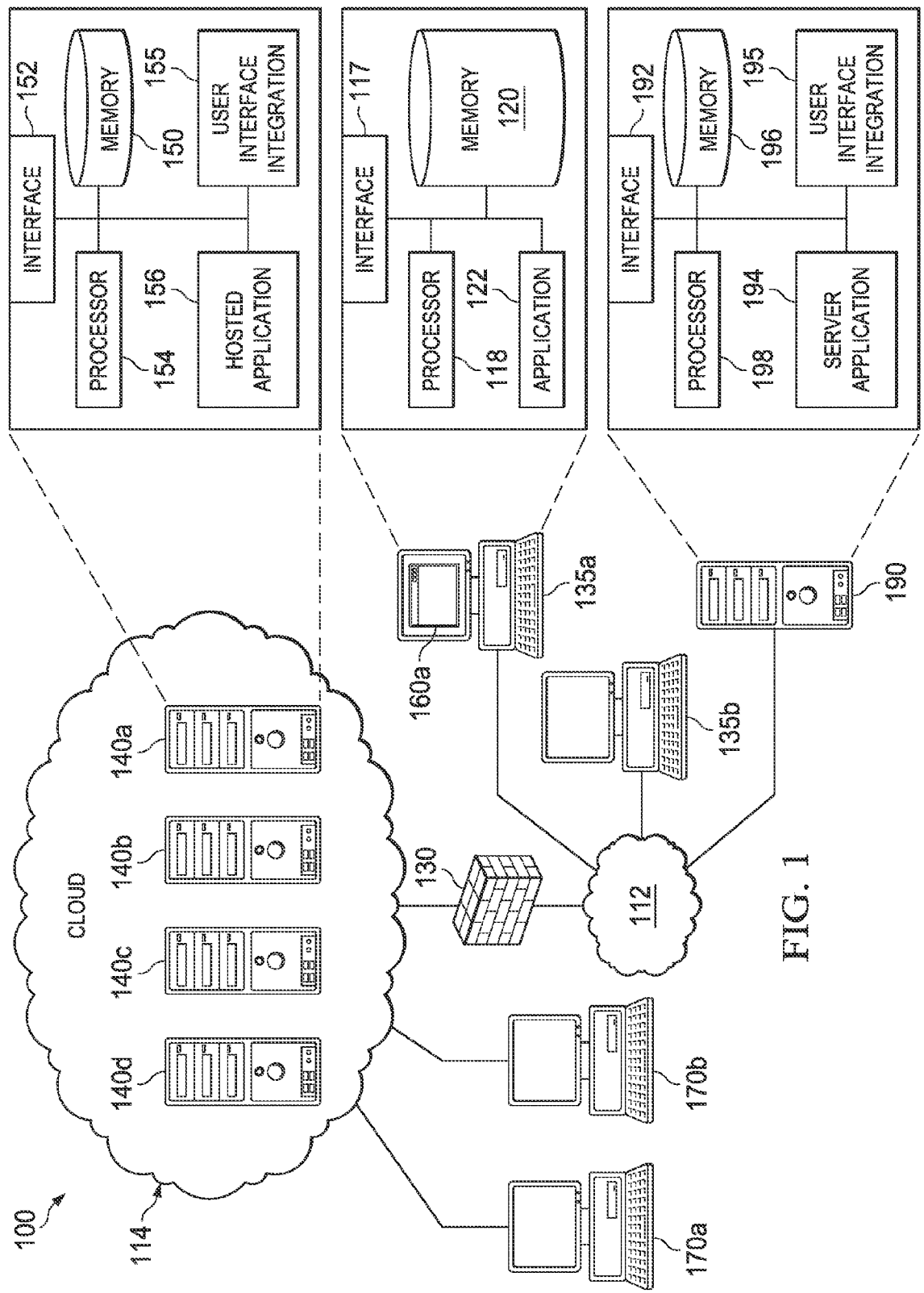
FIG. 1 illustrates an example environment implementing various features of providing user productivity and integrated services within the context of the present disclosure.

This disclosure generally describes computer systems, software, and computer implemented methods for providing user productivity and integrated services to an end-user. The user productivity and integrated services may include augmented features integrated into an existing business application through various deployment methods independent of the lifecycle or release of the existing business application. The existing business application may be complemented with additional features or even replaced with an entirely new business application. The additional features may include augmenting the user interface of the existing business application with new graphical objects that may enhance or complement the existing functionality and user interface of the business application based on the context in which the business application is used by an end-user. In some implementations, the additional features may include third party services or applications.

A flexible deployment model of the augmented features may also be provided to allow an appropriate deployment suitable to the needs, preferences, or context of the end-user. In certain implementations, the augmented features may be deployed through on-demand services, on-premise services, a combination of both on-demand and on-premise services, mobile services, or other suitable deployment methods. Further, the front-end and user interface integration aspects of the augmented features may be decoupled from the backend lifecycle of the underlying business application to allow for timely, efficient, and user/context-specific integration of user productivity and third party services. In some implementations, the configuration aspects of the user productivity and integrated services may be provided through different deployment models at different stages to simplify and streamline the configuration process. The configuration process may be initiated through on-demand user interface services to allow discovery, setup, and fine-tuning of content packages for certain roles, work centers, navigations, pages, or gadgets. The configuration process using on-demand services may be followed by deployment of the content packages containing the configuration data to run on-premise without connection to the on-demand services. Accordingly, business users may configure the content packages to address user processes that meet the specific needs of a business organization.

For example, a business customer may want to configure defined roles and run Work Centers within a corporate network. A set of UI integration and productivity services (e.g., roles, work centers, page builders, work lists, assistance panels) may be able to be configured by Line-of-Business (LOB) units of the business customer, then loaded from a download site to be deployed and run inside the on-premise system. In another example, a business customer may receive a new application with a set of UI integration services embedded within the new application. The business customer may be given the ability to run the UI integration services on-premise or update, configure, and run the services on-demand.

A set of user productivity features may be integrated with an existing business application based on the context associated with the business application and the user of the business application. The set of features may be included as a context-sensitive augmentation of the current business application or of the graphical user interface (GUI) of the current business application. In some implementations, the context-sensitive augmentation may include a side panel to the current application, a menu or navigation tree, or a dedicated new application built to optimize the usability and productivity of frequently needed user interactions. Further, the context-sensitive augmentation may include integration of third party services or user interfaces into the current business application, such as third party search services or social networking services, for example, without modifying or upgrading the current business application.

The augmented features may be delivered to a user independent of a particular deployment model for an underlying business application or a particular release or lifecycle of the business application. A user may be able to access on-premise productivity features or on-demand productivity features separately or in combination. A seamless interchange may be provided between different deployment models, such as on-premise, on-demand, or mobile deployment models. For example, certain users may be given a selection between consuming landscape-wide UI integration and productivity services via on-demand models or on-premise models. In some implementations, information technology (IT) groups or Line-of-Business (LOB) units within an organization may be able to decide whether UI integration and productivity services are consumed through on-demand services, or downloaded and applied for use within the organization's on-premise landscape or on a particular user's desktop.

Generally, the functionality of the different applications is augmented such that the augmented features are integrated with certain existing features in the existing application based on similar or related functionality. For example, the existing application may provide information related to a geographic location of a customer in a sales order. The existing application may be augmented with a third party map search service to display the geographic location of the customer on a map. The particular address field of the customer in the existing application, however, may not be exposed to the map search service as currently implemented in the existing application. Accordingly, the context-sensitive augmentation may expose the address fields in the existing application to the map search service without modifying the existing application.

In some implementations, the particular augmentation applied to a business application may be based on the context associated with the user of the business application or the features being used. In certain instances, the augmented features or applications may need to be integrated into an existing application based on the integration context associated with the different applications. Each release of a business application may have different attributes, configurations, roles, or user interfaces. The integration context may provide information regarding the specific releases of the different applications or features that are to be augmented with user productivity and integration services. The integration context may then be used to determine the particular features or options that will be augmented on top of the existing features in the current release of the underlying business application. For example, in an older release of a business application, certain work list items may have been represented in a different way than in a newer release. The augmented features, however, may simply present an approval or disapproval graphical object that allows the user to approve the work list item regardless of the business application release currently used. Accordingly, a business application may be augmented with features that are independent of a specific release of the business application.

Some augmented features may be integrated with the existing application based on a role context associated with a user of the existing application. In some instances, the role context may include information defining a certain role of a user of the existing application within a business organization. Certain features may be provided to the user through the context-sensitive augmentation based on the role of the user. For example, a user with the role of a procurement manager within an organization may be provided access to available business and market information of a vendor and information associated with assigning a vendor to a material in a material replenishment scenario. Another type of context used to integrate augmented features may include a user context of the user of the existing application. The user context may include information indicating personal preferences or habits that influence the usability or productivity of the existing application. For example, based on the user context, augmented features may be provided to a user based on metadata indicating preferred user contact for requesting information in certain scenarios or providing access to a calendar when the user performs certain tasks.

Other contexts may include a departmental, networking, or friends context. In some implementations, the departmental/networking/friends context may include information reflecting certain best practices when a user works within a particular department or within a network of people while using an existing application. For example, a customer service agent of an international ordering department may be required to complete a spreadsheet checklist for handling customer service requests before an actual service request in a Customer Relationship Management (CRM) system can be processed. The augmented features for a business application may accordingly include quick access to a customized spreadsheet document for completing the customer service task when the user is using the application in association with the international ordering department. In another example, augmented features may be automatically integrated into an application when other colleagues within a user's network are detected. In one example, a report may be automatically generated for informing the user of how certain trusted members of the user's network value different reports associated with the user's business organization.

The example contexts described above provide information for the features, information, or graphical components to include in a context-sensitive augmentation for the business application. The various contexts for providing augmented features may be end-user dependent, allowing various features or tools to be provided based on specific contexts associated with a user without modifying or upgrading the business application. Accordingly, the augmented features may be directed at specific needs of a user while being independent of the life cycle of the business application or a specific deployment model, and the functionality of older applications may be used with newer features or third party services in a timely manner.

Turning to the illustrated example, FIG. 1 illustrates an example environment 100 for providing user productivity and integrated services to an end-user. The illustrated environment 100 includes or is communicably coupled with one or more servers 140 and one or more clients 135, at least some of which communicate across network 112. In some implementations, the one or more servers 140 provide a set of services to the client 135, and they may be logically grouped and accessible within a cloud computing network 114. In general, environment 100 depicts an example configuration of a system capable of providing user productivity and integrated services to clients while being independent of a particular release, lifecycle or deployment model of an underlying business application. The environment 100 also supports a system capable of enabling users to configure content packages associated with the user productivity and integrated services through different deployment models at different stages of the configuration process.

The illustrated environment of FIG. 1 includes one or more clients 135. Each client 135 may be any computing device operable to connect to or communicate with other computing devices via the network 112 or with at least the servers 140 or 190 using a wireline or wireless connection. Further, as illustrated by client 135a, each client 135 includes a processor 118, an interface 117, a graphical user interface (GUI) 160a, a client application 122, and a memory 120. In some implementations, a server application 194 can be executed at a server 190 but accessed and displayed at client 135 in GUI 160a. The server application 194 is hosted in memory 196 at server 190, which can be physically located on the premises of client 135. In general, each client 135 comprises an electronic computer device operable to receive, transmit, process, and store any appropriate data associated with the environment 100 of FIG. 1. It will be understood that there may be any number of clients 135 associated with, or external to, environment 100. For example, while illustrated environment 100 includes two clients (135a and 135b), alternative implementations of environment 100 may include a single client 135 communicably coupled to the servers 140, or any other number suitable to the purposes of the environment 100. Additionally, there may also be one or more additional clients 135 external to the illustrated portion of environment 100 that are capable of interacting with the environment 100 via the network 112. Further, the terms "client," "user," and "end-user" may be used interchangeably as appropriate without departing from the scope of this disclosure. Moreover, while each client 135 is described in terms of being used by a single user, this disclosure contemplates that many users may use one computer, or that one user may use multiple computers.

As used in this disclosure, client 135 is intended to encompass a personal computer, touch screen terminal, workstation, network computer, kiosk, wireless data port, smart phone, personal data assistant (PDA), one or more processors within these or other devices, or any other suitable processing device. For example, each client 135 may comprise a computer that includes an input device, such as a keypad, touch screen, mouse, or other device that can accept user information, and an output device that conveys information associated with the operation of servers 140 and 190 or the client 135 itself, including digital data, visual information, the client application 122, server application 194, or the GUI 160a. Both the input and output device may include fixed or removable storage media such as a magnetic storage media, CD-ROM, or other suitable media to both receive input from and provide output to users of the clients 135 through the display, namely, the GUI 160a.

Generally, example client 135 may be communicably coupled with a network 112 that facilitates wireless or wireline communications between the components of the environment 100 (i.e., between each client 135 as well as between client 135 and servers 140 and 190), as well as with any other local or remote computer, such as additional clients, servers, or other devices communicably coupled to network 112 but not illustrated in FIG. 1. In the illustrated environment, network 112 is illustrated as a single network in FIG. 1, but may be a continuous or discontinuous network without departing from the scope of this disclosure, so long as at least a portion of the network 112 may facilitate communications between senders and recipients. The network 112 may be all or a portion of an enterprise or secured network, while in another instance at least a portion of the network 112 may represent a connection to the Internet. In some instances, a portion of the network 112 may be a virtual private network (VPN), such as, for example, the connection between the clients 135a and 135b and one or more servers 140 and 190. Further, all or a portion of the network 112 can comprise either a wireline or wireless link. Example wireless links may include 802.11a/b/g/n, 802.20, WiMax, and/or any other appropriate wireless link. In other words, the network 112 encompasses any internal or external network, networks, sub-network, or combination thereof operable to facilitate communications between various computing components inside and outside the illustrated environment 100. The network 112 may communicate, for example, Internet Protocol (IP) packets, Frame Relay frames, Asynchronous Transfer Mode (ATM) cells, voice, video, data, and other suitable information between network addresses. The network 112 may also include one or more local area networks (LANs), radio access networks (RANs), metropolitan area networks (MANs), wide area networks (WANs), all or a portion of the Internet, and/or any other communication system or systems at one or more locations.

In the illustrated environment 100, each of the clients 135 may belong to a network 112 that is maintained by an organization such as a company. The organization may incorporate clients 135 into a security domain to reduce security risks to the organization's data accessible via network 112. Accordingly, communication between clients 135 and server 190 within the organization's network 112 and computing devices external to the organization, such as servers 140 within cloud computing network 114 for example, may be governed by a firewall 130. Firewall 130 may comprise any device or set of devices configured to monitor and control data communications between different security domains (i.e., between devices connected via network 112 and servers 140 within the cloud computing network 114). Firewall 130 can be implemented in either hardware or software or both. The organization may have an information technology (IT) department that manages firewall 130 as well as the installation of applications on each client 135 and server 190.

Client 135 may have access to resources external to the firewall 130 including computing devices 170, other networks such as the Internet, and servers 140 within cloud computing network 114. The servers 140 within the cloud computing network 114 comprise a cloud computing platform for providing cloud-based services. The terms "cloud," "cloud computing," and "cloud-based" may be used interchangeably as appropriate without departing from the scope of this disclosure. Cloud-based services can be hosted services that are provided by servers and delivered across a network to a client platform to enhance, supplement, or replace applications executed locally on a client computer. Clients 135 can use cloud-based services to quickly receive software upgrades, applications, and other resources that would otherwise require a lengthy period of time before the resources can be delivered to the client 135.

Client 135 may receive or implement applications using various deployment models such as through on-demand services or on-premise services. As described in the present disclosure, on-demand services can include multiple types of services such as products, actionable analytics, enterprise portals, managed web content, composite applications, or capabilities for creating, integrating, and presenting business applications. For example, the cloud-based implementation of the present disclosure can allow clients 135 to transparently upgrade from an older user interface platform to newer releases of the platform without loss of functionality. Users of a server application 194 can also obtain suggested configuration settings for use with server application 194 based on user context data associated with the user. Based on the user's own self configuration settings and on user context data comprising situational data associated with the user, recommendations for increasing productivity for the user can be provided to the user.

On-demand services can be hosted services that are provided over a network such as the Internet in a cloud computing implementation. In some implementations, the hosted services are computing resources such as business applications, software, data, and storage space that are stored or located at servers within the cloud computing network but that are provided to an end-user directly over the Internet or accessed by the end-user from a web browser. Thus, an existing business application can be complemented with additional features or even replaced with an entirely new business application through the cloud computing network without the installation of new software on a client computer or the involvement of an information technology (IT) department. In addition, data for improving user productivity can be shared among multiple end-users through the cloud computing network such as, for example, preferred business application configuration data or other information associated with best practices. To meet the ever growing and changing demands of businesses, a user of a business application can be provided with a flexible, integrated, and "self-service" work environment.

On-premise services can include various services provided to client 135 from within a business organization's security domain, such as services downloaded from servers (e.g., server 190) behind the firewall 130. The network protected by the firewall 130 may be an internal network for members of the business organization. In certain instances, the services provided through on-premise deployment may benefit from security measures provided by the firewall 130, an IT department of the business organization, or other security features provided by the business organization for devices in the same company network.

Augmented features may be provided in a flexible manner independent of a particular deployment model and based on the needs of the end-user. On-demand deployment may be more appropriate for certain situations while on-premise deployment may be better in other instances. For example, users can register in a cloud-based environment which allows the users to download additional features and capabilities to enhance the user's productivity on demand rather than relying on on-premise applications provided by a user's employer, for example, to increase user productivity features. The users can also store the user context data on a cloud-based server, which allows sharing knowledge with other users and increasing the speed at which new user productivity features are provided, as well as improved integration with other web-based solutions in the cloud-computing network. On-demand services may also be less costly to maintain from a hardware or operational perspective. On-premise services may provide increased security as the services are running behind a firewall 130, which may limit the amount of traffic to and from external sources. Accordingly, end-users may not be restricted to a specific deployment model and may be given the flexibility to use one or more different deployment models, including using multiple deployment models for different aspects of the augmented features. In the illustrated example, a user may utilize user productivity and integration services via on-demand services implemented by a UI integration module 155 at a server 140a in the cloud-computing network. Alternatively or in addition, the user productivity and integration services may be provided to the user via on-premise services implemented by a UI integration module 195 at a server 190 behind a firewall 130 of a business organization.

Additional on-demand services can also be implemented using the techniques described in the present disclosure. A tagging infrastructure and application interrogation APIs (application programming interface) can be used to augment and enhance existing applications. Applications can be interrogated to identify data objects for annotation via tags. The cloud-computing environment can then attach on-demand services to particular annotated and tagged objects such as search, mail, and financial data services. Thus, different applications and services can be coupled and augmented without changing the source code to the underlying applications. Moreover, on-demand services for automating tasks can record user interaction sequences and play the sequences back as needed so that users do not have to repeat repetitive tasks. Personal workflows can be optimized and elements of an application can work more effectively together using on-demand services for automating tasks. In addition, collaboration and decision making tools can be integrated into the existing customer landscape using on-demand services. Also, users can be enabled to create portal pages containing static content in conjunction with applications. Still further, existing applications can be simplified using on-demand services so that only the elements and information needed for the current task performed by the application are shown to a user.

In general, server 140a is any server that stores one or more hosted applications 156, where at least a portion of the hosted applications 156 are executed via requests and responses sent to users or clients within and communicably coupled to the illustrated environment 100 of FIG. 1. For example, server 140a may be a Java Platform, Enterprise Edition (JEE)-compliant application server that includes Java technologies such as Enterprise JavaBeans (EJB), JEE Connector Architecture (JCA), Java Messaging Service (JMS), Java Naming and Directory Interface (JNDI), and Java Database Connectivity (JDBC). In some instances, the server 140a may store a plurality of various hosted applications 156, while in other instances, the server 140a may be a dedicated server meant to store and execute only a single hosted application 156. In some instances, the server 140a may comprise a web server, where the hosted applications 156 represent one or more web-based applications accessed and executed via network 112 by the clients 135 of the system to perform the programmed tasks or operations of the hosted application 156.

At a high level, the server 140a comprises an electronic computing device operable to receive, transmit, process, store, or manage data and information associated with the environment 100. The server 140a illustrated in FIG. 1 can be responsible for receiving application requests from one or more server applications 194 associated with the clients 135 of environment 100 and responding to the received requests by processing said requests in the associated hosted application 156, and sending the appropriate response from the hosted application 156 back to the requesting server application 194. Alternatively, the hosted application 156 at server 140a can be capable of processing and responding to local requests from a user accessing server 140a locally. Accordingly, in addition to requests from the external clients 135 illustrated in FIG. 1, requests associated with the hosted applications 156 may also be sent from internal users, external or third-party customers, other automated applications, as well as any other appropriate entities, individuals, systems, or computers.

As used in the present disclosure, the term "computer" is intended to encompass any suitable processing device. For example, although FIG. 1 illustrates a group of servers 140, environment 100 can be implemented using computers other than servers, including a server pool. Indeed, server 140 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated server 140 may be adapted to execute any operating system, including Linux, UNIX, Windows, Mac OS, or any other suitable operating system. According to one embodiment, server 140 may also include or be communicably coupled with a mail server.

In the present implementation, and as shown in FIG. 1, the server 140a includes a processor 154, an interface 152, a memory 150, and one or more hosted applications 156. The interface 152 is used by the server 140a for communicating with other systems in a client-server or other distributed environment (including within environment 100) connected to the network 112 (e.g., client 135, as well as other systems communicably coupled to the network 112). Generally, the interface 152 comprises logic encoded in software and/or hardware in a suitable combination and operable to communicate with the network 112. More specifically, the interface 152 may comprise software supporting one or more communication protocols associated with communications such that the network 112 or interface's hardware is operable to communicate physical signals within and outside of the illustrated environment 100.

As illustrated in FIG. 1, server 140a includes a processor 154. Although illustrated as a single processor 154 in FIG. 1, two or more processors may be used according to particular needs, desires, or particular embodiments of environment 100. Each processor 154 may be a central processing unit (CPU), a blade, an application specific integrated circuit (ASIC), a field-programmable gate array (FPGA), or another suitable component. Generally, the processor 154 executes instructions and manipulates data to perform the operations of server 140 and, specifically, the one or more plurality of hosted applications 156. Specifically, the server's processor 154 executes the functionality required to receive and respond to requests from the clients 135 and their respective client applications 122 or server applications 194, as well as the functionality required to perform the other operations of the hosted application 156 or UI integration module 155.

Regardless of the particular implementation, "software" may include computer-readable instructions, firmware, wired or programmed hardware, or any combination thereof on a tangible and/or non-transitory medium operable when executed to perform at least the processes and operations described herein. Indeed, each software component may be fully or partially written or described in any appropriate computer language including C, C++, Java, ABAP (Advanced Business Application Programming), Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate. In the illustrated environment 100, processor 154 executes one or more hosted applications 156 on the server 140a.

At a high level, each of the one or more hosted applications 156 is any application, program, module, process, or other software that may execute, change, delete, generate, or otherwise manage information according to the present disclosure, particularly in response to and in connection with one or more requests received from the illustrated clients 135 and their associated client applications 122 or server applications 194. In certain cases, only one hosted application 156 may be located at a particular server 140. In others, a plurality of related and/or unrelated hosted applications 156 may be stored at a single server 140, or located across a plurality of other servers 140, as well. In certain cases, environment 100 may implement a composite hosted application 156. For example, portions of the composite application may be implemented as Enterprise Java Beans (EJBs) or design-time components may have the ability to generate run-time implementations into different platforms, such as JEE (Java Platform, Enterprise Edition), ABAP (Advanced Business Application Programming) objects, or Microsoft's .NET, among others. Additionally, the hosted applications 156 may represent web-based applications accessed and executed by remote clients 135 or server applications 194 via the network 112 (e.g., through the Internet). Further, while illustrated as internal to server 140, one or more processes associated with a particular hosted application 156 may be stored, referenced, or executed remotely. For example, a portion of a particular hosted application 156 may be a web service associated with the application that is remotely called, while another portion of the hosted application 156 may be an interface object or agent bundled for processing at a remote client 135. Moreover, any or all of the hosted applications 156 may be a child or sub-module of another software module or enterprise application (not illustrated) without departing from the scope of this disclosure. Still further, portions of the hosted application 156 may be executed by a user working directly at server 140, as well as remotely at client 135.

As illustrated, server 140a can also include a UI integration module 155 that provides context-specific augmentation of an existing business application by integrating additional features or UI components without modifying the existing business application. As used in the present disclosure, the UI integration module 155 may be separate from the hosted application 156, while in other instances, the UI integration module 155 may be embedded within or part of the hosted application 156 or one or more other hosted applications. In some implementations, the additional features and services provided by the UI integration module 155 are designed to augment an existing transaction or application and can be provided graphically, such as in the form of a side panel object that is displayed concurrently with the user interface of the existing application. The side panel can interact with existing applications and transactions and visually represent additional user productivity services based on a context associated with the user. In certain implementations, the UI integration module 155 may integrate specific features into the existing application based on one or more contexts, such as an integration context, a role context, a user context, or a departmental/network/friend context, for example. The UI integration module 155 may also allow or facilitate sharing of contextual information among related users within a network to increase user productivity. The side panel object may integrate the settings, features, or applications used by other users sharing similar contextual information with a current user of an existing application. For example, users sharing similar roles, departments, or preferences may be presented with information related to the settings or features of the other similar users.

The side panel object may integrate external or third party services into an existing application to improve, extend, or complement the functionality within the existing application. For example, the side panel can act as a document management service allowing users to add and store, via the side panel, attachments relevant to the user's current working context. Existing services provided in a business application can also be enhanced via the side panel. For example, in addition to basic help content provided by an on-demand application, users can also integrate existing help content from a hosted environment or any other help providing environments. Furthermore, such help information can be shared among other users via on-demand services.

In general, the server 140a also includes memory 150 for storing data and program instructions. Memory 150 may include any memory or database module and may take the form of volatile or non-volatile memory including, without limitation, magnetic media, optical media, random access memory (RAM), read-only memory (ROM), removable media, or any other suitable local or remote memory component. Memory 150 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the server 140a and its one or more hosted applications 156. Still further, memory 150 may include any other appropriate data, such as VPN applications, firmware logs and policies, HTML files, data classes or object interfaces, unillustrated software applications or sub-systems, firewall policies, a security or access log, print or other reporting files, as well as others.

While FIG. 1 is described as containing or being associated with a plurality of elements, not all elements illustrated within environment 100 of FIG. 1 may be utilized in each alternative implementation of the present disclosure. For example, although FIG. 1 depicts a server-client environment implementing a hosted application 156 at server 140 that can be accessed by client computer 135, in some implementations, server 140 can execute a local application that features an application user interface accessible to a user directly utilizing GUI 160b to inject software components representing user productivity and integration services to the application user interface. Additionally, one or more of the elements described herein may be located external to environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
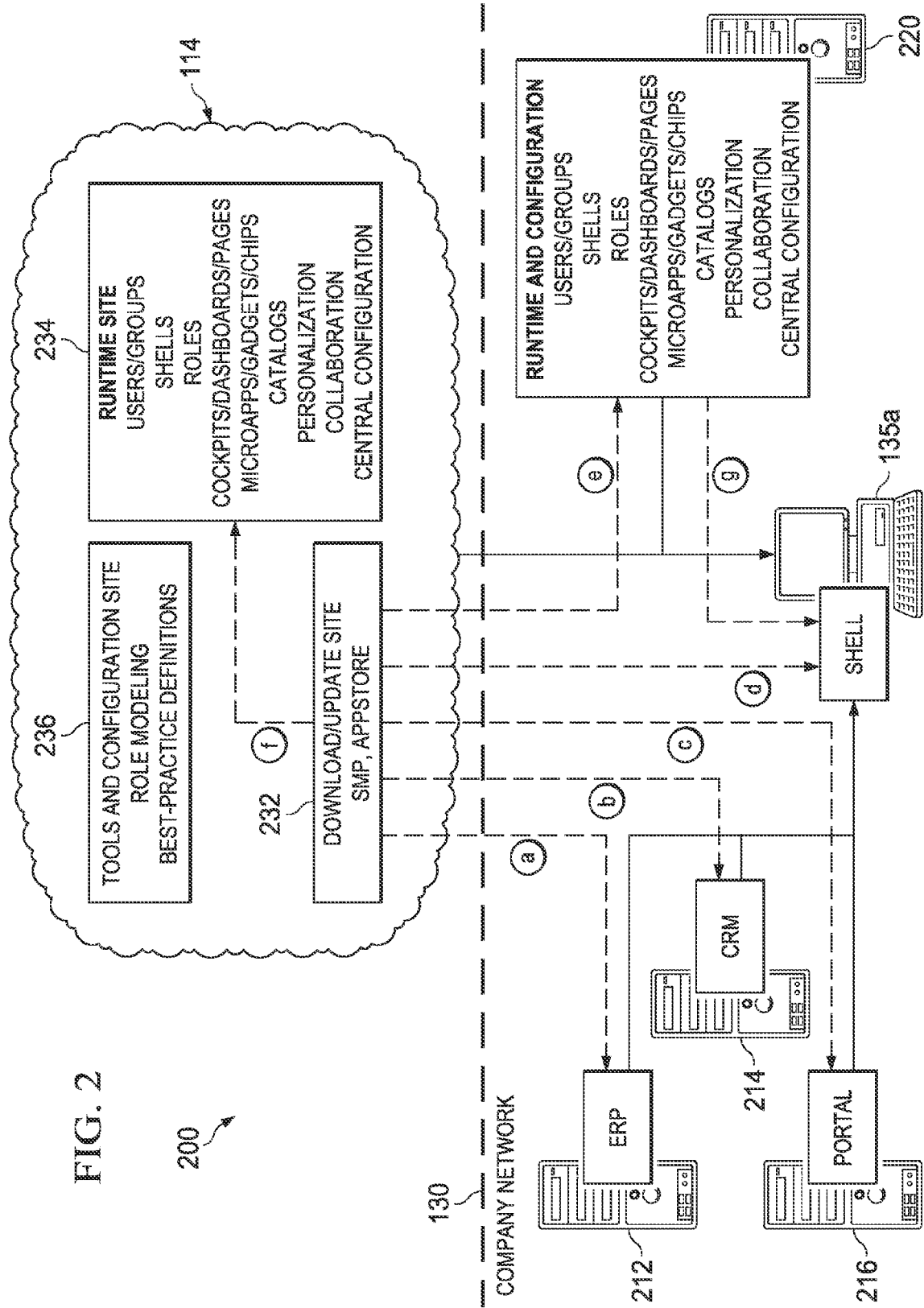
FIG. 2 illustrates another example environment for providing user productivity and integrated services within the context of the present disclosure.

FIG. 2 illustrates another example environment 200 for providing user productivity and integration services to a client computer 135a. Specifically, FIG. 2 represents a concrete diagram of user productivity services that can be downloaded from a cloud-based network or the and run either locally, on-premise, or on the cloud. Tools, configuration and modeling capabilities can be done performed and implemented centrally from the cloud, without a need for those tools, configuration, and modeling capabilities to be available and/or bundled for on-premise usage. As depicted in FIG. 2, a client computer 135a may reside behind a firewall 130 of a business organization or company. The firewall 130 may provide security to resources within the company network. In some implementations, the company network may include various servers for providing different services to clients behind the firewall 130 or other resources in the company network. For example, a server 212 may host an Enterprise Resource Planning (ERP) system configured to manage roles, profiles, and authorization data to support clients in the company network in performing various tasks. The role maintenance functionality provided by the ERP server 212 may automate various processes based on user roles and allow the client 135a flexibility in implementing authorization plans based on roles of various users within the company network. Another server 214 within the company network may host a Customer Relationship Management (CRM) system. The company may also have a server 216 acting as a portal to provide a central location for accessing various resources or allowing users within the company network to access resources outside the firewall 130. In some instances, an installation server 220 within the company network may allow users in the company to download and install applications or files behind the firewall 130. Accordingly, a user of client 135a may access on-premise services through servers 212, 214, 216, and 220. Further, although not depicted, other servers in the company network may provide additional services to clients behind firewall 130.

In some implementations, components behind the firewall 130 may access resources outside the firewall 130, such as resources provided through a cloud network 114 or other on-demand services. Various servers within the cloud network 114 may host on-demand services, such as a download/update site 232, a runtime site 234, or a tools and configuration site 236. In general, the on-demand services may be provided to clients within a company network without requiring company servers to host the on-demand services. In some implementations, applications or other software may be downloaded by client 135a or other clients directly from a server in the cloud network 114 hosting a download/update site 232. Other on-demand services may include runtime components that are integrated into applications running on the client 135a at runtime. The runtime components may be provided by servers hosting a runtime site 234 as depicted in FIG. 2. The runtime components may include features based on users, groups, or roles associated with the client 135a, or other user interface components or augmented functionality, including shells, cockpits, dashboards, pages, microapps, gadgets, gadgets, or catalogs for applications running on client 135a. In some implementations, the on-demand services provided by the runtime site 234 may include personalization, collaboration, or central configuration features to enhance the user productivity of client 135a.

Each of the services 232, 234, 236 in the cloud network 114 may operate in connection to provide context-specific on-demand services to client 135a that are decoupled from the lifecycle of applications running on the client 135a. In certain implementations, for example, a user of a business application on client 135a requests an on-demand service available from the cloud computing network 114. User context metadata associated with the business application is identified and transmitted to the cloud computing network 114. Updated metadata associated with the on-demand service comprising additional features of the business application is received from the cloud computing network. The updated metadata is then applied to a user interface associated with the business application, allowing the user to utilize the requested on-demand service without acquiring additional software for installation on client 135a. In other implementations, the user of the business application may store configuration settings of the business application. The configuration settings and situational data associated with the user are transmitted as user context data to a server in the cloud computing network 114. Based on the user context data, recommendations for improving productivity such as suggested configuration settings are generated and transmitted to the user at client 135a.

Some of the on-demand services may include context-specific user productivity and integration services provided by a UI integration module 155 as described above in connection with FIG. 1. In some implementations, a user interface of an application running on the client 135a may be augmented with a shell component at runtime, as described in further detail below in relation to FIG. 3A, to provide a visual framework for integrating additional features into the application. The additional features may include graphical components that provide an updated user interface as well as augmented functionality related to existing features in the application. The new graphical components supported by the shell may include a side panel with additional features or third party services that enhance user productivity for the application based on various contexts associated with a user of the application. Other graphical components may also be provided based on context, such as dashboards, pages, or gadgets.

Although the context-specific user productivity and integration services may be provided as on-demand services through the cloud network 114, the services may also be provided as on-premise services through servers within a company network, as illustrated in FIG. 2. The installation server 220, for example, is located behind the firewall 130 and may host various runtime and configuration components for clients within the company network. Some of the components hosted by the installation server 220 may include many of the same services provided through the runtime site 234 in the cloud network 114. Accordingly, a user of client 135a may not be restricted to a single deployment model when accessing the context-specific user productivity and integration services. Instead, different deployment models may be used to provide augmented features to client 135a, including through a cloud network 114 as an on-demand service or through services hosted by servers within a company network of the client 135a.

The landscape illustrated in FIG. 2 may allow for business-driven, decoupled configuration of application content packages. In some instances, the original developers of a business application may not be aware of newer developments in technology, business practices, or specific roles or needs of a business customer or organization. For example, the original developers of the business application may have been unaware of how new social networking applications and trends could be integrated into a company's business processes. Further, individual users may have specific needs for certain new features that may not be used by a significant number of other users in the organization. The individual user, however, may have specialized knowledge in a particular area such that the new features would be beneficial to the individual user, but due to the specialized nature of the feature, a full-scale update of the entire business application may not be justified. Accordingly, the UI integration and user productivity services may be decoupled from the lifecycle and deployment of the business application to allow members of the business customer who are more familiar with the requirements of the organization to self-service the integration services. Business customers may initiate development of configurable aspects of a business application and receive content packages from services provided through the cloud network 114 and then, in turn, implement the content packages as on-premise services to clients within the company network.

Figure 4B:
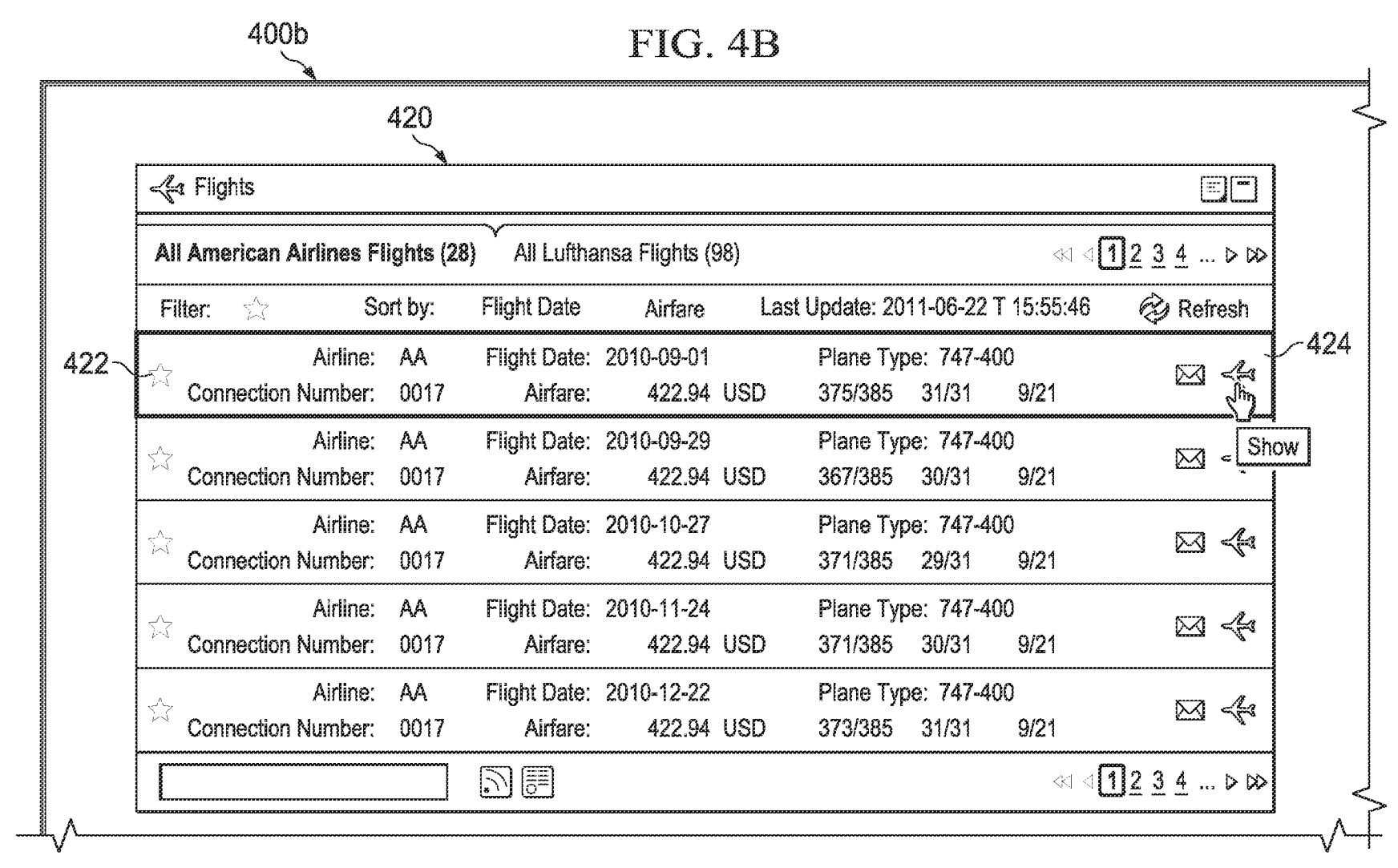

For example, many of the augmented features may originate from a download/update site 232 in the cloud network 114. In some instances, an IT department, LOB unit, stakeholder, partner, or other lead users within the company may manage configuration of various aspects of a business application. These members of the company may be in the best position to determine the new roles, implementations, practices, or navigation requirements for the integration services. Accordingly, the lead user may access configuration services provided through the cloud network 114, such as using the tools and configuration site 236, to discover, setup, and fine-tune content packages suited to the needs and preferences of members of the company. In some implementations, the tools and configuration site 236 are provided as on-demand services and may include a configurator tool that allows a user to configure the integration services that will be delivered based on the functionality of a back-end system running the business application. The lead users may, for example, define or model certain roles within the company using the tools and configuration site 236 to define permissions, best-practices, documents, or other data associated with those roles. In some instances, the content packages may include work centers, navigation centers, pages, gadgets, or other features that may be integrated into an existing application. As illustrated in FIGS. 4A-4B, for example, a configurator tool may allow user-driven configuration and selection of specific tables, columns, or links to different services that can be integrated into a user interface of a business application.

The content packages configured by the lead users may then be downloaded to different servers in the company network, such as depicted in states (a), (b), (c), or (e), before they are distributed to clients as on-premise services through on-premise servers 212, 214, 216, or 220. The augmented features may be downloaded to the installation server 220 at state (e), for example, before they are downloaded and installed at client 135a during state (g). Accordingly, a lead user may configure and obtain certain UI integration and user productivity services initially through on-demand services by receiving content packages at corporate servers within the company network. The lead user, IT department, or other business unit may then manage and deploy the received content as on-premise services for clients 135a in the company network.

Alternatively, some applications and updates may be downloaded as on-demand services directly from the download/update site 232 by client 135a as depicted in state (d). In some instances, a new application that already contains the UI integration and productivity services may be downloaded to client 135a directly from the cloud network 114. Once downloaded, however, the user may be given the ability to run the UI integration and productivity services on-premise or to update, configure, and run the services on-demand. Further, the features may be implemented at runtime of the business application running on client 135a, which may require transmission of the augmented features from the download/update site 232 to the runtime site 234 in the cloud network 114, as represented in state (f), before the features are integrated into the application at client 135a at runtime. Additional flexibility may be provided to the user of client 135a by distributing different features or stages of the user productivity and integration services through different channels. Although separate data and user interface components may typically be consolidated on an application server as a central location for distributing services to client 135a, the data and user interface components may instead be obtained by client 135a from different sources and different deployment models, as depicted in the different distribution channels represented by states (a)-(g) in FIG. 2. Accordingly, the augmented features may be provided through the appropriate channel based on the particular context associated with the client 135a.

Figure 3A:
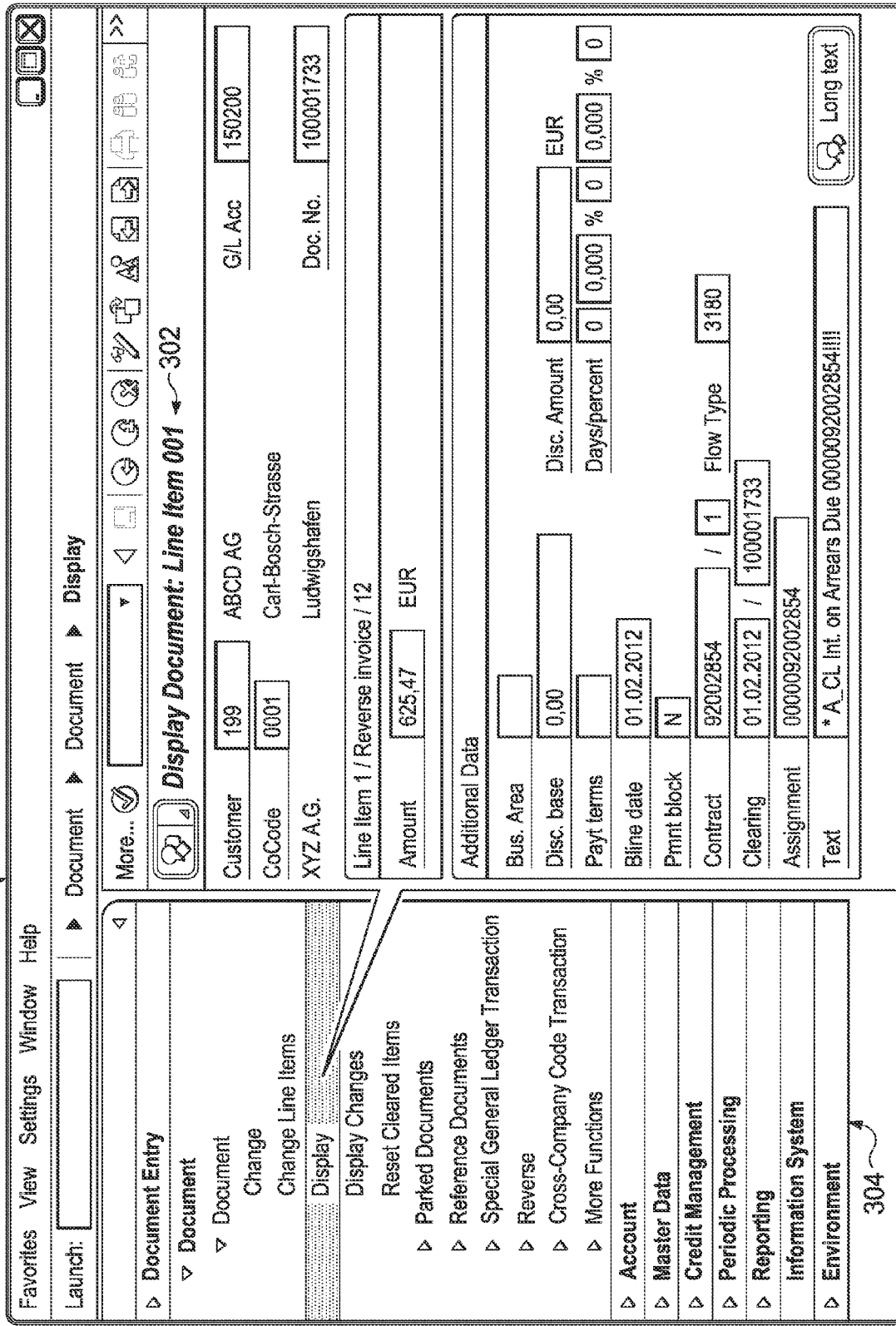
Figure 3D:
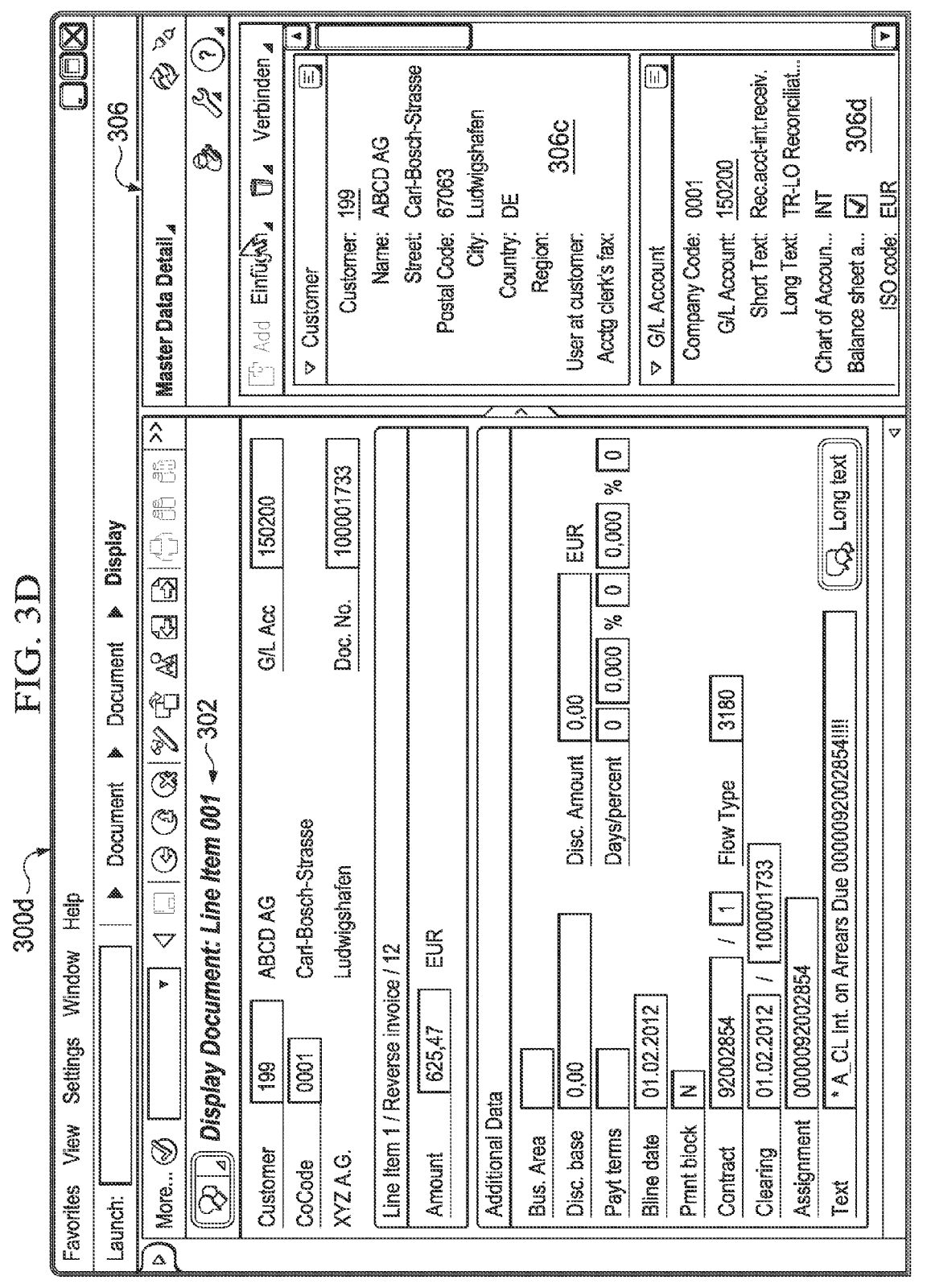

FIGS. 3A-3G illustrate example screenshots of context-specific user productivity and integration services provided for an existing application. As seen in FIG. 3A, a user interface of an existing application 302 may be augmented with a shell component 304. The existing application 302 may be a legacy business application that forms a core application for a business organization, a frequently used application, or other application that may not include certain features that are available through upgrades or integration services. For example, in some instances, a company may not obtain the latest upgrade for a legacy business application due to prohibitive cost, deficient resources, lack of need, needing only specific features in an upgrade, or other reasons. In other cases, a business application may receive updates to some of its functionality, but elements of its user interface may remain largely unchanged. In certain instances, the layout of a business application or the way the application interacts with the user may not be easily changed. Certain augmented features, however, may still be provided to users of the legacy business application through user productivity and integration services without requiring an upgrade or modification of the core functionality or user interface of the business application.

As illustrated in the example screenshot 300a of FIG. 3A, for example, a shell component 304 is generated adjacent to or around the user interface of the legacy business application 302. The user interface of the business application 302 may remain unchanged, but the shell component 304 may include an additional graphical object that presents additional functionality to a user that may not have been available with the current version of the business application 302. In some instances, the additional functionality provided in the shell component 304 may be based on a user role associated with the user. For example, the business application 302 may include many features and functions that are directed at various roles within a business organization. A single user having a particular role, however, may only need or be allowed to access a portion of the entire functionality of the business application. The shell 304 may enhance navigation of existing parts of the business application 302 based on the role of the user in a business process. In the illustrated example, the shell 304 may present options to navigate through certain documents, allowing the user to display or perform various tasks related to the documents. In some instances, the user may only be allowed to navigate to the documents that are permitted for users having the same role. Although the user may be able to access the documents using the user interface of the business application 302, the shell 304 may provide quick navigation to relevant documents based on the user's role. At the same time, the user may still use the existing and unchanged features of the business application 302.

In some implementations, the shell 304 provides a desktop component for the business application 302 that is configured to access metadata associated with the user's role within a business organization. Based on the user's metadata, certain features can be dynamically injected into the user interface. The features presented to the user of the business application 302 may change based on the changing role of the user within the organization. Further, the business application 302 may be configured to not only be updated with additional features and options in response to changes to a user's role metadata but also in response to external status changes such as changes in the business' status or the status of third party business entities related to the user. A persistent business context is applied to a user's application workspace that ensures the application workspace reflects changes to business entities and applicable business processes that are of interest to the user or that are associated with the user's role within the business. Accordingly, the application workspace may be updated based on identification of new third party services or changes to existing third party services.

FIG. 3B illustrates an example screenshot 300b of additional user productivity and integration services provided for a business application 302. In some implementations, a side panel object 306 may also be presented adjacent to the user interface of the business application 302. The side panel 306 may include various options to complement the functionality of the business application 302 based on a context associated with the user of the business application 302. The context of the user may include a user role, similar to the functions provided in the shell 304, but may also include various other contexts upon which the options in the side panel 306 are based. The integration context, role context, user context, departmental/networking/friends context, or a combination of these contexts or other contexts may be used to determine the augmented features provided in the side panel 306. In some implementations, for example, the functionality currently displayed in the user interface portion of the business application 302 may affect the augmented features displayed in the side panel 306 based on the integration context. The particular role or preferences of the user of the business application 302 may also determine the particular augmented features presented in the side panel 306 based on the role or user context.

In certain implementations, the augmented features in the side panel 306 for a particular user may be based on preferences of other users as determined by a departmental/networking/friends context. For example, users within a business organization may share their preferences or the functionality that they frequently use or recommend using to other users within certain networks. In some instances, an action taken by a particular socially connected or otherwise related user may be provided in the side panel 306, such as by listing information or links used by the related user. For example, a particular link to additional functionality may include a statement such as "Link added by Markus C." or "Report added by Filip M." A user may share preferences, actions, and/or activities with other users in the same department or sub-group, for example, or with "friends" in a social networking group. In certain instances, a particular user may also "follow," or track the status of, other users to determine certain best practices or commonly used settings or features. Individual users or groups may determine what aspects of the side panel 306 are shared with what groups of users. For example, the components in the side panel 306 for each user may be tailored specifically for that user, but those components may be shared with other users in different scenarios. Users may choose to share certain functionality in a side panel 306 with other users, or other users may choose to view the components that other users have in their side panel 306, depending on the permission settings chosen by the other users. Accordingly, the side panel 306 may display various features based on the departmental/networking/friends context of the user. In some implementations, users may share documents that are appropriate for certain business contexts with other users within a departmental/networking/friends context. The user who is sharing a particular document may control authorization of the users that are permitted to view the document. At least one benefit of the sharing of features, settings, or preferences among groups of users is quick scalability and dissemination of new functionality that may not otherwise be used by end-users without requiring upgrades to existing business applications.

As illustrated in FIG. 3B, the features presented in the side panel 306 may be specific to the functionality presented in the business application and the context associated with the user. The side panel 306 may include links to functionality that directly enhance the functionality of the business application 302 and that is likely helpful to the user. If the user is viewing a particular document in the business application 302 user interface, for example, the side panel 306 may display an option 306a to view the document flow associated with the document displayed in the business application 302 or allow the user to access an overview 306b of all related documents in the system.

A link in the side panel 306 may lead to other pages or windows displaying additional information associated with the document displayed in the business application 302. As illustrated in the example screenshot 300c of FIG. 3C, a document flow window 308 may be displayed if the user clicks on the link 306a depicted in the side panel 306. The flow of the particular document may be determined from the business application 302 and displayed in the document flow window 308.

In some implementations, a user of the user productivity and integration services or an administrator associated with the user's business organization may program customized content to include in the side panel 306. For example, users or administrators may develop new, customized functionality to include in the side panel 306 or even a new side panel 306 implementation using a page builder. As illustrated in the example screenshot 300d of FIG. 3D, for example, customizable mashup components 306c and 306d, also known as gadgets or chips, may be custom programmed for the side panel 306 to allow a user to view master data related to certain functions or documents associated with the business application 302. The mashup components 306c or 306d, or gadgets, can be a webpage, application, or part of an application such as a module, component, service, or subroutine that contains data or functionality that can be combined with another application or component, such as the business application 302 or side panel 306, into a new service or arranged in a particular layout along with other components to present a customized arrangement of applications for convenient access to a user. Specifically, the on-demand services provided by the side panel 306 can be included in or represented as software components called mashup components or gadgets 306c or 306d. Users can build the gadgets 306c or 306d from existing content elements of business applications such as screens, portal views, or dashboards. The gadgets can be visually represented as a user interface element that is easily moved from one location to another within the GUI 160a of a client computer 135a. Further, the gadgets can also be "mashable" in the sense that they can be linked with other components or with an underlying application for data flow. That is, input and output ports from one gadget can be connected to input and output ports of another gadget or application.

In some implementations, the gadgets 306c or 306d can also be incorporated into the side panel 306 by applying tagging data to data objects used by an application. Existing applications can be augmented and enhanced through a tagging infrastructure that associates data objects in an application with on-demand services. Tags can be applied to a data object that are merely descriptive of the data object, or the tags can be additional data linking the data object to a software component such as, for example, a gadget 306c or 306d. The tagging data applied to data objects helps facilitate user-intuitive extension of the functionality of current applications that do not necessarily have tagging capabilities. In some implementations, data objects can be graphical elements in the user interface of the application. Specifically, a business application 302 can be interrogated and particular data objects associated with the business application 302 can be annotated via tags. The existing personalization infrastructure of the business application 302 can be used to apply tagging data to data objects used by the application. The tagging data is not stored for a user interface element or a field of the user interface element but for bound data objects underlying the user interface element. The tagging data is stored in the same way as other kinds of personalization data for the business application 302. The gadgets 306c or 306d can then be executed using the tagged data objects as input values when the tagged data objects are selected. Thus, various user interface elements of the business application 302 can be linked with gadgets to enhance the functionality of the application 302.

Figure 3E:
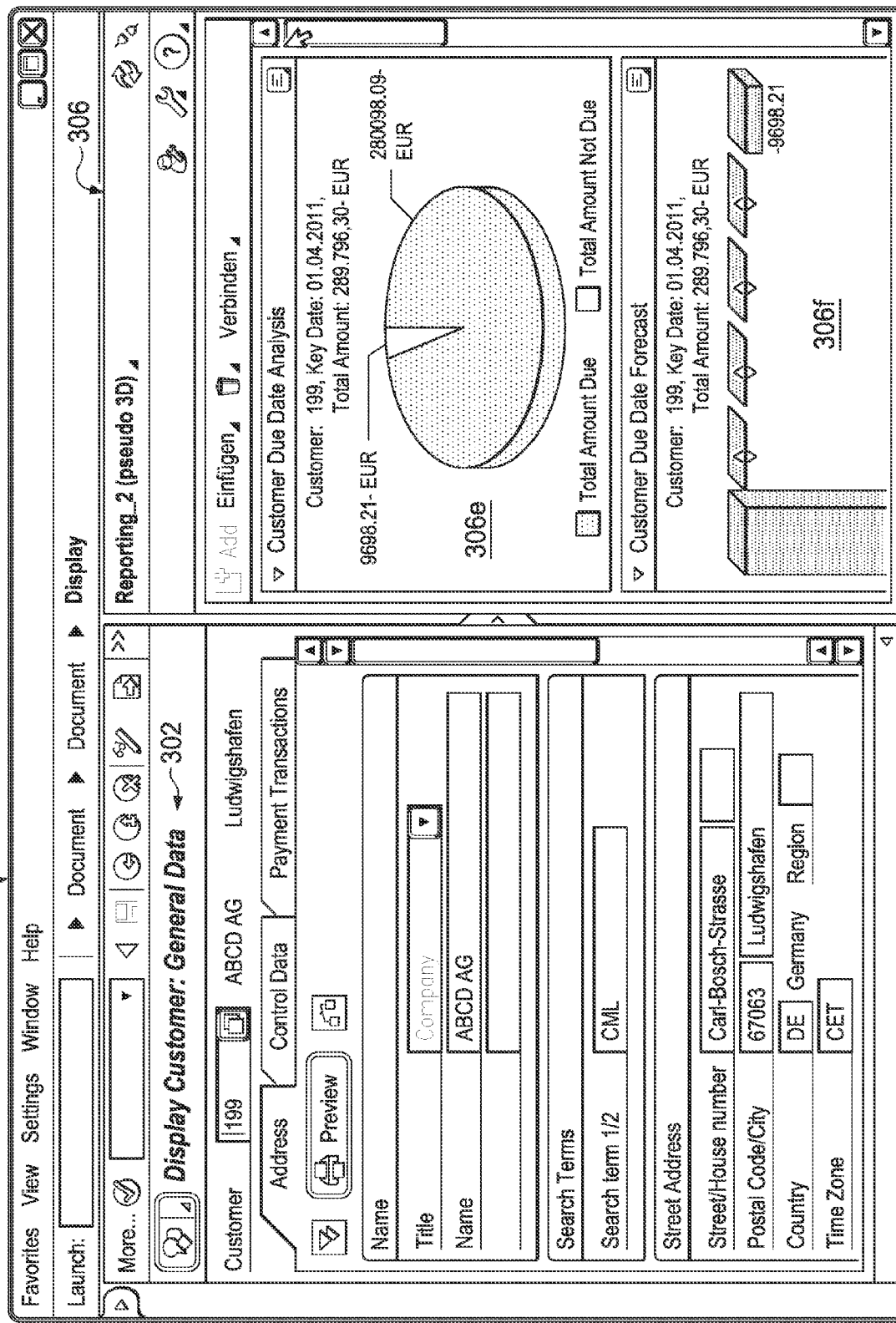

FIG. 3E illustrates another example screenshot 300e of augmented features that may be included in a side panel 306. In some implementations, context-specific on-demand analytic components may be automatically generated and included in the side panel 306 based on the context. For example, a user may select a mashup component 306c from the screenshot depicted in FIG. 3D to view master data in the business application 302. The business application 302 may display the master data in the user interface and, as illustrated in FIG. 3E, analytic on-demand services may be automatically called and displayed as components 306e and 306f in the side panel 306. The analytic components 306e and 306f may display information based on the context of the master data presented in the business application 302 user interface. In some implementations, the analytic information may be obtained from on-demand services in the cloud network 114 or from on-premise services in the company network associated with the client 135a and presented using a Business Context Viewer in the side panel 306.

Figure 3F:
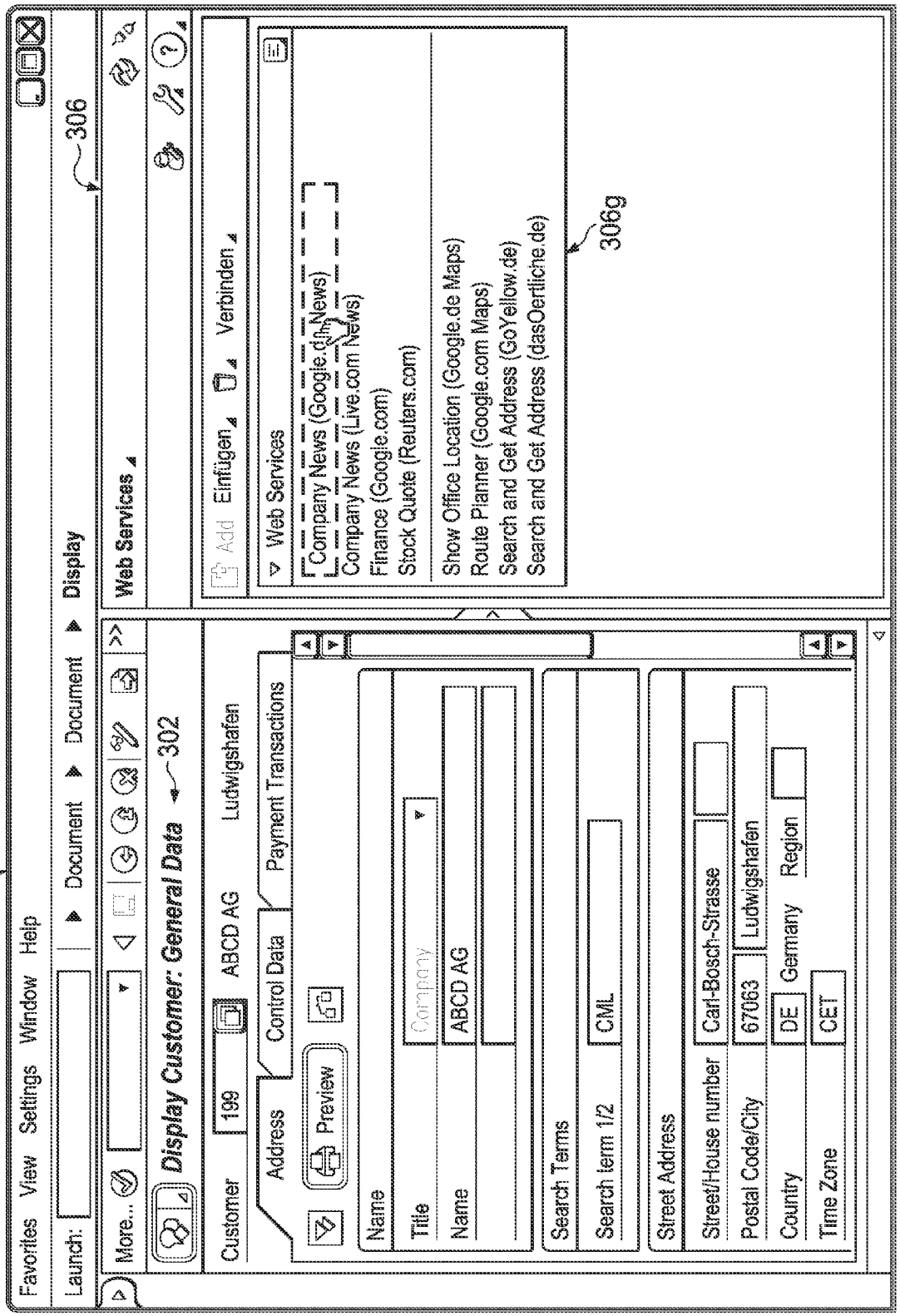
Figure 3G:
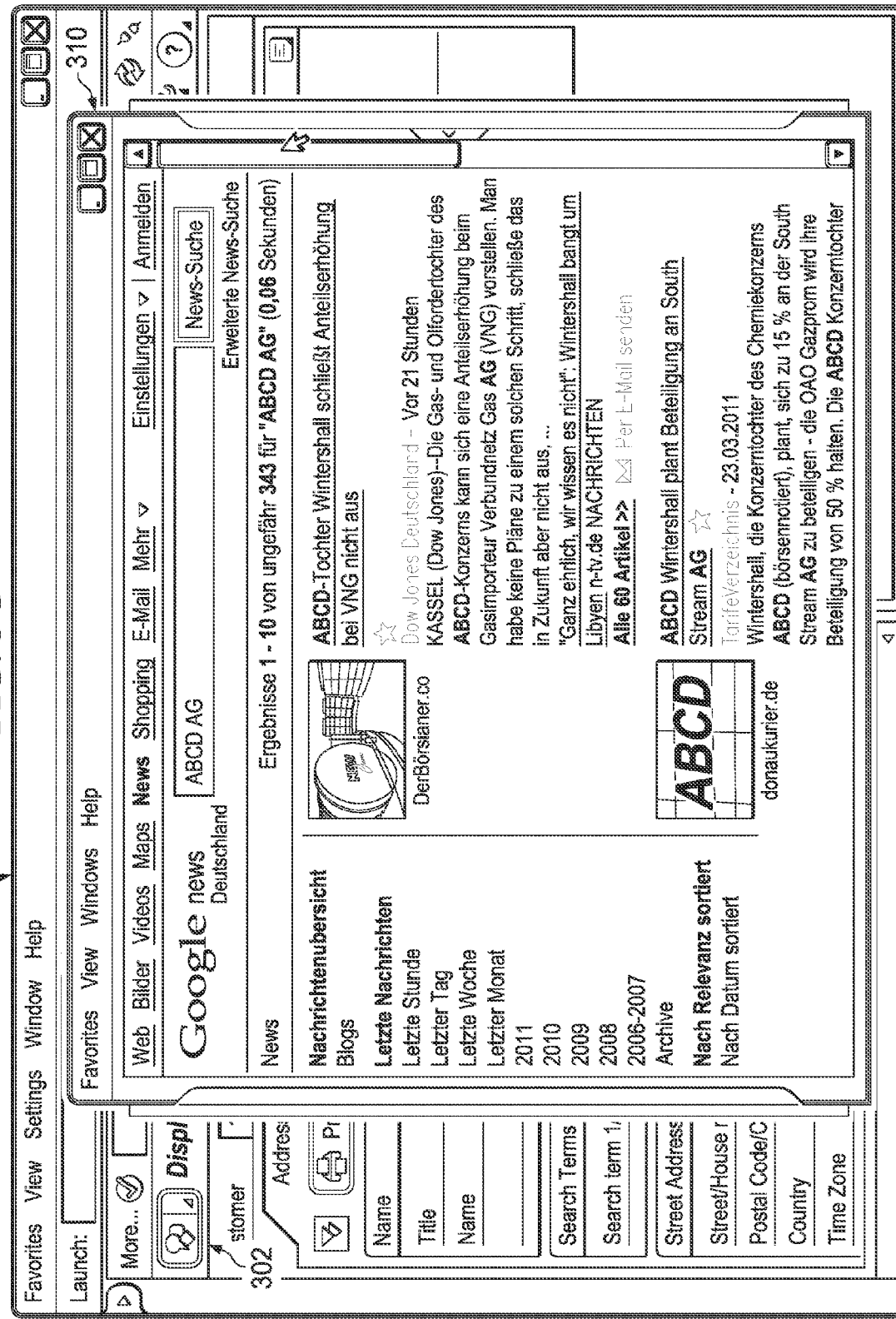

FIG. 3F illustrates another example screenshot 300f of augmented features that may be included in a side panel 306. In some implementations, the side panel 306 may display a variety of web services available to the user based on the content presented in the business application 302 user interface. For example, links to third party web services may be presented in the side panel 306 to allow the user to obtain additional information about currently presented data. In the illustrated example, the business application 302 user interface may contain data related to a particular company. Accordingly, the side panel 306 may present links 306g to search services to obtain news, stock quotes, addresses, or geographic landmarks associated with the particular company. The selection of a link in the side panel 306 may automatically initiate a request to the appropriate web service. As illustrated in the example screenshot 300g of FIG. 3G, for example, a new window 310 is displayed with search results from a search service for current news related to the particular company.

FIGS. 4A-4B illustrate example screenshots 400a and 400b of a configurator tool for allowing decoupled user-driven configuration of user productivity and integration services. In some implementations, a configurator tool is provided to allow a user to configure various aspects of an application or user productivity service that will be integrated with a business application based on the configuration of a back-end system running the business application. The configurator tool may be a centralized tool provided as an on-demand service, such as through a tools and configuration site 236 in a cloud network 114, as illustrated in FIG. 2. Turning to the illustrated example, FIG. 4A illustrates a business worklist configurator 402 tool that allows a user to configure the functionality and presentation of an application or service to be integrated with an existing business application. A first portion 404 of the configurator 402 presents fields populated with various details and options relating to the back-end systems running business applications. A back-end system may be any one or more servers hosting the business application or storing data associated with the business application for one or more clients.

For example, a plurality of back-end systems may be presented in a destination field 406 to allow a user to choose the back-end system destination for the configured services. The user may also choose the worklist type 408 and/or business application 410 associated with the configured services. The business worklists may include metadata for configuring and accessing particular application objects and functions, allowing efficient access to the application objects and functions without complex navigation through standard transactions involving the application's user interface. Business worklists can be generated automatically based on metadata concerning a user's role within an organization. Alternatively, business worklists can be manually created by users based on the user's own preferences or based on recognized best practices that can be shared across a network with other users. Users that share similarities in roles within their respective organizations, for example, may share their business worklists, or access to automatically generated worklists may be given to other users. The business worklists can be applied to an application to automatically configure the application or incorporate on-demand services into the application according to user preferences, best practices, or role metadata as defined in the business worklists. Further, the business worklists can be provided to mobile devices so that the content and configuration data of the application can be easily accessible on mobile devices. A user first selects a business worklist to be made available on a mobile device, and a gadget can be configured to push the business worklist and associated data to a mobile gateway, where the business worklist can be transferred to the mobile device. Thus, business worklist functionality and self-service mobility can be instantly delivered to users of the application and business worklists.

In some implementations, the user may define queries 412 for performing specific tasks on the appropriate back-end systems. The user may choose, for example, to query a particular back-end system for all flight information relating to different airlines if the user productivity service is for airline worklists. A second portion 414 of the configurator tool 402 may present options for a user to design the visual appearance of the user productivity service. Various tools may be provided to allow the user to designate and configure templates for the user interface aspects of the user productivity service.

FIG. 4B illustrates a screenshot 400b of a user productivity service configured using the configurator tool in FIG. 4A. As illustrated in FIG. 4B, a user productivity service for an airline may allow users to search for flights, which may be displayed in a table 420 of flights. The search results may be based on the queries 412 configured using the configurator tool 402 described in relation to FIG. 4A. Relevant data 422 associated with each flight, such as the airline, connection number, flight date, and other data in the back-end system, may be presented in the flight table 420. In some implementations, additional data may be searched through other action objects 424, such as querying the associated back-end system for all sales orders or all purchase orders related to the displayed flights.

FIG. 5 illustrates an example diagram 500 depicting release independent development and shipment of user productivity and integration services. In some implementations, the front end of a business application and the UI integration services may be decoupled from the business application back-end life cycle (i.e., core platform components) to be ready for short delivery cycles for productive use independent of the business application. The business application may comprise a middleware component or environment upon which other front-end software components are based. If the front-end components are tightly coupled to the middleware component, changes to the middleware to address issues related to one front-end component may adversely affect a second front-end component that is also based on the middleware component. The entire business application may need to be updated to accommodate changes to even small portions of the front-end components. Accordingly, in some instances, new user interface features or layouts for software components may also remain unchanged over many release cycles due to the tightly knit nature of some front-end components with back-end components.

As illustrated in FIG. 5, however, front-end components such as user interfaces may be decoupled from the release cycles of back-end applications. A particular application may have numerous releases of its back-end components that are currently in use by customers, for example. Each version of the back-end components may have some differences, and some versions may have incompatibilities with each other. In the illustrated example, a particular application may have four different releases 502a, 502b, 502c, and 502d currently in use by customers, with each release associated with a different development system. New user interface features 510a and 510b are developed independent of a particular version of the business application and developed, in this example, using the lowest business application version 502a out of the four different versions currently in use. For user interface features 510a and 510b developed using older release systems 502a, the changes may be compatible on all later releases as illustrated in FIG. 5. This allows users to develop new user interface features regardless of the release of the underlying business application.

For some functional features 520a and 522, some new features may be developed independent of a particular release while other features may need to be developed specifically for the particular release. For example, if changes to a particular integration component 522 would apply to all later releases, the change may be developed using the earliest release 502a, and the new integration component 522 may then be compatible with later releases of the business application. In certain instances, however, new releases of the business application may provide new functionality that is not compatible with older releases. Accordingly, in some cases, integration services that utilize the release-specific functionality of the business application may need to be developed using the earliest release of the business application that includes the release-specific functionality and that is compatible with the new service.

In FIG. 5, integration components 520a, 520b, 520c, and 520d are developed using development systems from separate releases. Each integration component developed using a particular release of the business application development system may utilize functionality that was first introduced in that release. The integration component may still be compatible with later releases of the business application development system but not with earlier versions because the earlier versions may not include the new release-specific functionality. Accordingly, integration component 520a, developed using development release 502a, may be compatible with release 502a and all later releases. Integration component 520c developed using development release 502c may be compatible with release 502c and 502d but not with releases 502a and 502b because releases 502a and 502b were introduced prior to release 502c.

Figure 6:
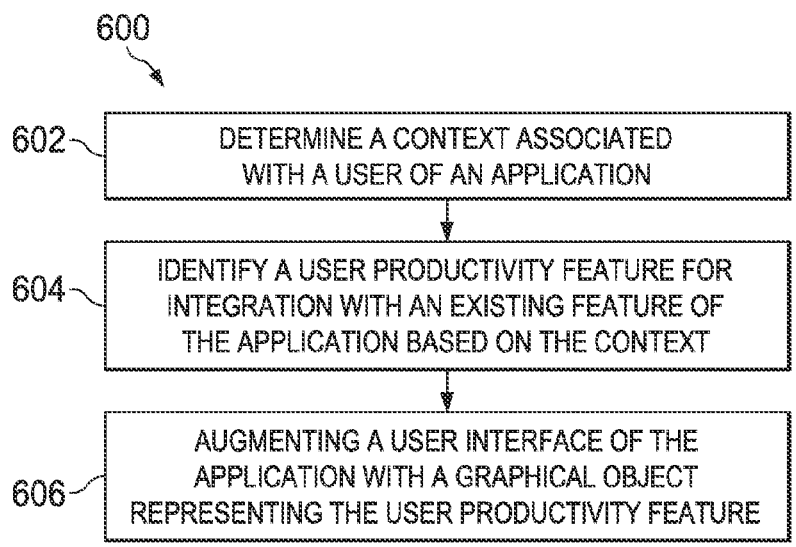
FIG. 6 illustrates an example process for providing integrated user productivity services using an appropriate system, such as the system described in FIG. 1.

FIG. 6 illustrates an example process 600 for providing integrated user productivity services. As illustrated in FIG. 6, a context associated with a user of an application is determined at 602. The context associated with the user may include different types of information that may be relevant in determining the particular user productivity or UI integration services to integrate with the application. In some implementations, the context may include an integration context defining a particular release version associated with the application, a role context defining a particular role of the user of the application within an organization, wherein the particular role is associated with a set of permissions or common tasks performed by the particular role, a user context defining a personal preference or habit of the user, or a social context defining a particular department, network, or set of online social connections associated with the user.

If the user productivity or integration service is based, at least in part, on the social context associated with the user, the user productivity feature that is integrated with the application may be a feature used by another user within the particular department, network, or set of online social connections. In certain instances, the user may provide authorization for sharing the user productivity feature with at least one other user within the particular department, network, or set of online social connections. A user productivity feature for integration with an existing feature of the application is identified based on the context at 604. The user productivity feature may, in some instances, include at least one of a feature provided through a web service, information related to a document selected by the user in the application, or analytical data based on information currently displayed in the user interface of the application. A user interface of the application is augmented with a graphical object representing the user productivity feature at 606. In some implementations, the graphical object may be a mashup component displaying data provided by a different application.

Figure 7:
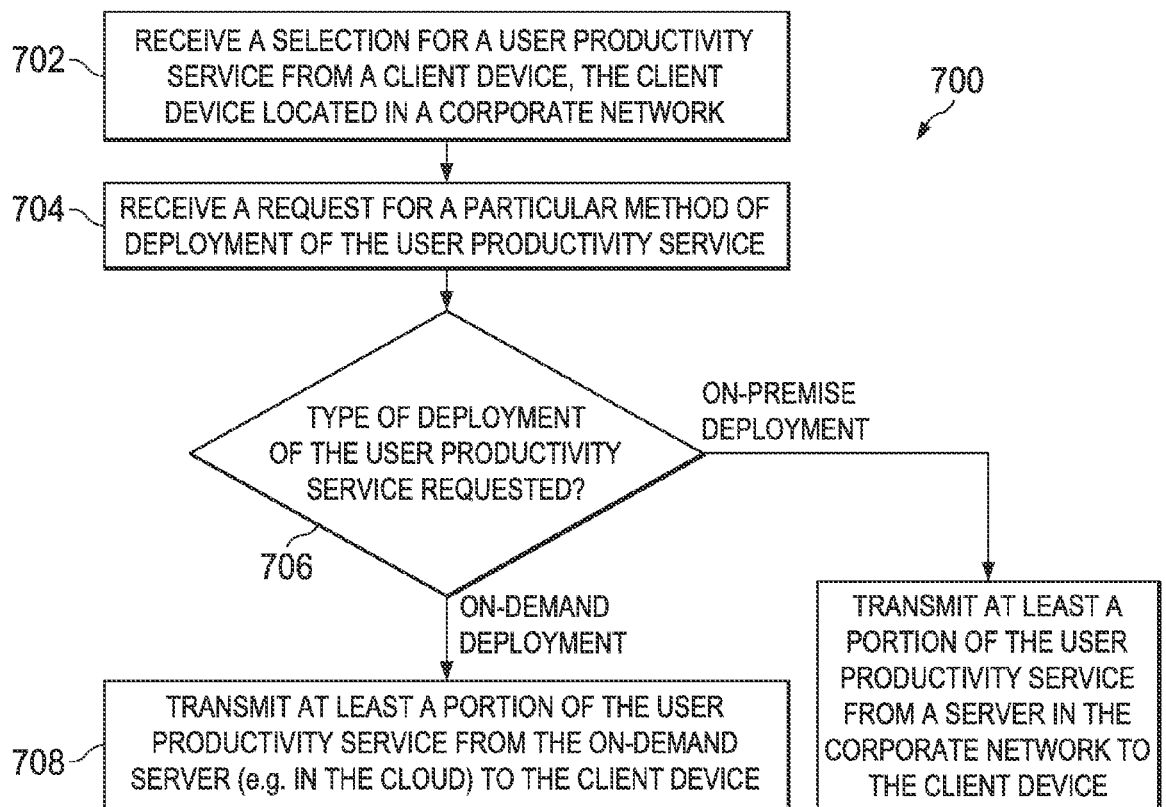
FIG. 7 illustrates an example process for providing single approach consumption of user productivity services using an appropriate system, such as the system described in FIG. 1.

FIG. 7 illustrates an example process 700 for providing single approach consumption of user productivity services. A selection for a user productivity service is received from a client device at 702, the client device located in a corporate network. The corporate network may be a security network of a business organization that includes the client device, the server, and a firewall providing secure communications from at least the client device and the server to devices external to the firewall. The user productivity service may include at least one of a feature provided through a web service, information related to a document selected by a user, or analytical software operable to display relevant data based on information currently displayed in the user interface of the application. A request for a particular method of deployment of the user productivity service is received at 704. A determination is made as to what type of deployment method is requested for deploying the user productivity service at 706. If it is determined that on-demand deployment has been requested, at least a portion of the user productivity service is transmitted from the on-demand server (e.g. in the cloud) to the client device at 708. If it is determined that on-premise deployment has been requested, at least a portion of the user productivity service is transmitted from a server in the corporate network to the client device at 710.

In some implementations, the deployment of the user productivity service may include two or more stages. Accordingly, a first portion may be deployed through on-demand services while a second portion may be deployed through on-premise services. Alternatively, the first portion may be deployed through on-premise services while the second portion may be deployed through on-demand services. On-demand deployment of the user productivity service may include providing the user productivity service as a hosted service on a server in a cloud network, while on-premise deployment of the user productivity service may include configuring the user productivity service for processing by an intermediary unit in the corporate network before installation of the user productivity service on the client device. The intermediary unit may be, for example, an information technology (IT) department, a Line-of-Business (LOB) user, or other lead user familiar with the requirements of end-users of the user productivity services.

Figure 8:
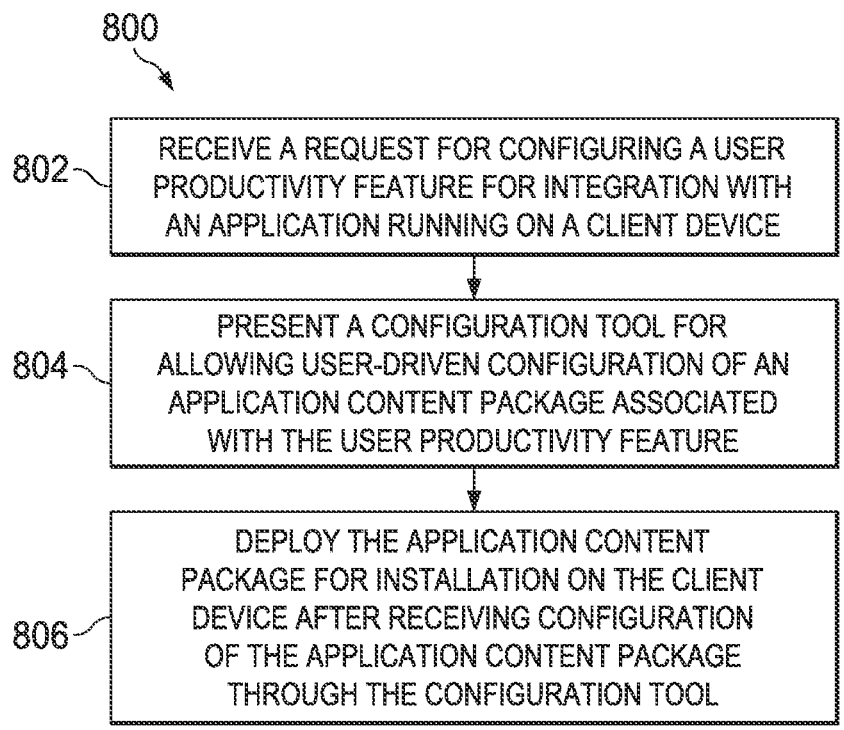
FIG. 8 illustrates an example process for providing user-driven configuration of application content packages using an appropriate system, such as the system described in FIG. 1.

FIG. 8 illustrates an example process 800 for providing user-driven configuration of application content packages. A request is received for configuring a user productivity feature for integration with an application running on a client device at 802. A configuration tool for allowing user-driven configuration of an application content package associated with the user productivity feature is presented at 804. In some implementations, the configuration tool may be a hosted service provided on a server in a cloud network. Presenting the configuration tool may include presenting one or more back-end systems associated with the application for selection as a destination for the user productivity feature. The configuration tool may also include options for allowing a user to define a query for data stored on a back-end system associated with the application or options for allowing a user to configure a user interface of the user productivity feature. The application content package is deployed for installation on the client device after receiving configuration of the application content package through the configuration tool at 806. Deploying the application content package may include transmitting at least a portion of the application content package to an intermediary unit within a corporate network for on-premise installation of the application content package on the client device.

Figure 9:
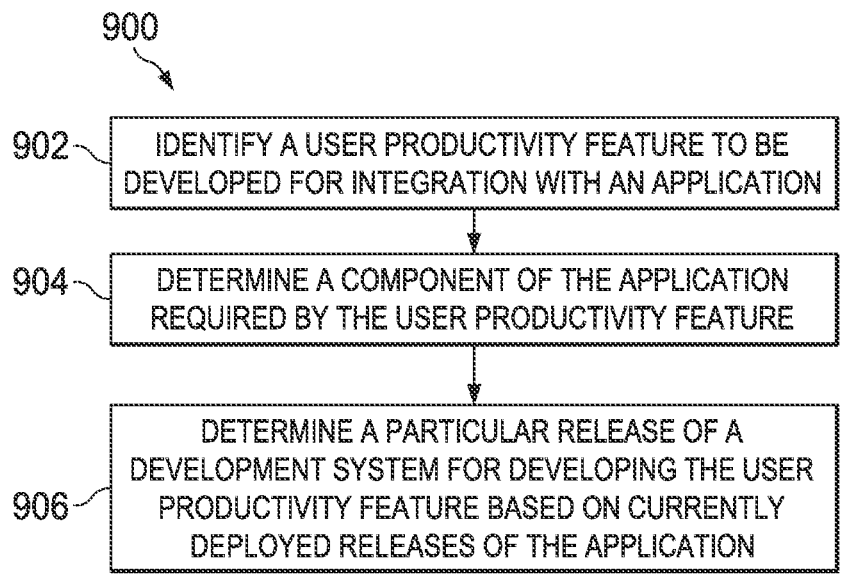
FIG. 9 illustrates an example process 900 for providing release-independent deployment of user productivity services using an appropriate system, such as the system described in FIG. 1.

FIG. 9 illustrates an example process 900 for providing release-independent deployment of user productivity services. A user productivity feature to be developed for integration with an application is identified at 902. A component of the application required by the user productivity feature is determined at 904. A particular release of a development system is determined for developing the user productivity feature based on currently deployed releases of the application at 906. In some implementations, the particular release of the development system corresponds to an earliest release of the application out of the currently deployed releases of the application. The particular release of the development system may correspond to a first release of the application out of the currently deployed releases of the application, the first release of the application including a first release of the application containing the component of the application. The user productivity feature may include a user interface element designated for development in an earliest release of the application out of the currently deployed releases of the application. Further, the user productivity feature may be a front-end aspect of the application based on a back-end aspect of the application, including middleware components, and deployment of the front-end aspect of the application is decoupled from a lifecycle of the back-end aspect of the application.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer implemented method performed by one or more processors for providing integrated productivity services, the method comprising the following operations:

executing a computer software application that is associated with a user;

determining, using user context data, a context associated with the user of the application by accessing a cloud-based server on which the user context data is stored;

identifying an application-executable user productivity feature to augment the application and for integration with an existing feature executable by the application based on the context, wherein the user productivity feature is integrated with the existing feature independent of the lifecycle or release of the application, and wherein the application excludes the user productivity feature prior to the identifying;

executing a user interface integration module configured to provide context-specific augmentation of user productivity features to the application, the user interface integration module being separate from the application;

augmenting a user interface of the application with a graphical object representing the user productivity feature; and providing the graphical object to the application to be displayed concurrently with a user interface of the application, wherein the graphical object is configured to interact with the application and to integrate the user productivity feature into the application.

2. The method of claim 1, wherein the context includes an integration context defining information regarding a particular release version associated with the application.

3. The method of claim 1, wherein the context includes a role context defining a particular role of the user of the application within an organization, wherein the particular role is associated with a set of permissions or common tasks performed by the particular role.

4. The method of claim 1, wherein the context includes a user context defining a personal preference or habit of the user.

5. The method of claim 1, wherein the context includes a social context defining a particular department, network, or set of online social connections associated with the user.

6. The method of claim 5, wherein the user productivity feature is a feature used by another user within the particular department, network, or set of online social connections.

7. The method of claim 5 further comprising sharing the user productivity feature with at least one other user within the particular department, network, or set of online social connections in response to an authorization for sharing the user productivity feature from the user.

8. The method of claim 1, wherein the user productivity feature includes at least one of a feature provided through a web service, information related to a document selected by the user in the application, or analytical data based on information currently displayed in the user interface of the application.

9. The method of claim 1, wherein the graphical object includes a mashup component displaying data provided by a different application.

10. The method of claim 1, wherein the user productivity feature includes functionality related to a functionality of the existing feature of the application.

11. A computer program product encoded on a non-transitory storage medium, the product comprising computer readable instructions for causing one or more processors to perform operations comprising:
  executing a computer software application that is associated with a user;
  determining, using user context data, a context associated with the user of the application by accessing a cloud-based server on which the user context data is stored;
  identifying an application-executable user productivity feature to augment the application and for integration with an existing feature executable by the application based on the context, wherein the user productivity feature is integrated with the existing feature independent of the lifecycle or release of the application, and wherein the application excludes the user productivity feature prior to the identifying;
  executing a user interface integration module configured to provide context-specific augmentation of user productivity features to the application, the user interface integration module being separate from the application;
  augmenting a user interface of the application with a graphical object representing the user productivity feature, wherein the application is configured to execute the user productivity feature in response to the augmenting; and
  providing the graphical object to the application to be displayed concurrently with a user interface of the application, wherein the graphical object is configured to interact with the application and to integrate the user productivity feature into the application.

12. The product of claim 11, wherein the context includes an integration context defining information regarding a particular release version associated with the application.

13. The product of claim 11, wherein the context includes a role context defining a particular role of the user of the application within an organization, wherein the particular role is associated with a set of permissions or common tasks performed by the particular role.

14. The product of claim 11, wherein the context includes a user context defining a personal preference or habit of the user.

15. The product of claim 11, wherein the context includes a social context defining a particular department, network, or set of online social connections associated with the user.

16. The product of claim 15, wherein the user productivity feature is a feature used by another user within the particular department, network, or set of online social connections.

17. The product of claim 15 further comprising sharing the user productivity feature with at least one other user within the particular department, network, or set of online social connections in response to an authorization for sharing the user productivity feature from the user.

18. The product of claim 11, wherein the user productivity feature includes at least one of a feature provided through a web service, information related to a document selected by the user in the application, or analytical data based on information currently displayed in the user interface of the application.

19. The product of claim 11, wherein the graphical object includes a mashup component displaying data provided by a different application.

20. A system, comprising:
  one or more computers; and
  a computer-readable medium coupled to the one or more computers having instructions stored thereon which, when executed by the one or more computers, cause the one or more computers to perform operations comprising:
    executing a computer software application that is associated with a user;
    displaying a user interface of the application;
    determining, using user context data, a context associated with the user of the application by accessing a cloud-based server on which the user context data is stored;
    identifying an application-executable user productivity feature to augment the application and for integration with an existing feature executable by the application based on the context, wherein the user productivity feature is integrated with the existing feature independent of the lifecycle or release of the application, and wherein the application excludes the user productivity feature prior to the identifying;
    executing a user interface integration module configured to provide context-specific augmentation of user productivity features to the application, the user interface integration module being separate from the application;
    identifying a graphical object representing the user productivity feature;
    augmenting the application with the user productivity feature; and
    displaying the graphical object representing the user productivity feature concurrently with the user interface of the application, wherein the graphical object is configured to interact with the application and to integrate the user productivity feature into the application.

* * * * *